(12) United States Patent
Yu

(10) Patent No.: US 11,381,527 B2
(45) Date of Patent: Jul. 5, 2022

(54) INFORMATION PROMPT METHOD AND APPARATUS

(71) Applicant: HUAWEI TECHNOLOGIES CO., LTD., Guangdong (CN)

(72) Inventor: Xiaobo Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/470,003

(22) PCT Filed: Feb. 23, 2017

(86) PCT No.: PCT/CN2017/074549
§ 371 (c)(1),
(2) Date: Jun. 14, 2019

(87) PCT Pub. No.: WO2018/107580
PCT Pub. Date: Jun. 21, 2018

(65) Prior Publication Data
US 2020/0092231 A1      Mar. 19, 2020

(30) Foreign Application Priority Data

Dec. 15, 2016   (CN) .......................... 201611160430.5

(51) Int. Cl.
*H04L 51/02*      (2022.01)
*G06F 40/30*      (2020.01)
(Continued)

(52) U.S. Cl.
CPC .............. *H04L 51/02* (2013.01); *G06F 40/30* (2020.01); *H04L 51/16* (2013.01);
(Continued)

(58) Field of Classification Search
CPC ......... H04L 51/02; H04L 51/12; H04L 51/16; H04L 51/32; H04L 67/22; H04L 67/306;
(Continued)

(56) References Cited

U.S. PATENT DOCUMENTS 8,370,948 B2 * 2/2013 Troyansky .............. H04L 51/34
726/22
9,405,343 B2 * 8/2016 Nesladek .......... H04M 1/72412
(Continued)

FOREIGN PATENT DOCUMENTS

CN        101834809 A      9/2010
CN        102868812 A      1/2013
(Continued)

OTHER PUBLICATIONS

Skeels MM, Grudin J. When social networks cross boundaries: a case study of workplace use of facebook and linkedin. InProceedings of the ACM 2009 international conference on Supporting group work May 10, 2009 (pp. 95-104). (Year: 2009).*
(Continued)

*Primary Examiner* — James N Fiorillo
(74) *Attorney, Agent, or Firm* — Fish & Richardson P.C.

(57) ABSTRACT

The present disclosure relates to information prompt methods and apparatus. One example method includes determining a first communication object from a target communication object set, obtaining first interaction information corresponding to the first communication object, receiving input information by using an information input interface of the first communication object, determining a matching degree between the input information and the first communication object based on the input information and the first interaction information, and performing prompt if the matching degree is less than a first threshold.

20 Claims, 22 Drawing Sheets

(51) Int. Cl.
  *H04L 51/00* (2022.01)
  *H04L 61/4594* (2022.01)
  *H04L 67/50* (2022.01)
  *H04L 67/306* (2022.01)

(52) U.S. Cl.
  CPC ......... *H04L 61/1594* (2013.01); *H04L 67/22* (2013.01); *H04L 67/306* (2013.01)

(58) Field of Classification Search
  CPC . H04L 61/1594; H04L 67/12; H04L 61/1547; H04L 12/58; H04L 12/2803; H04L 29/08; H04L 29/12; H04L 43/00; G06F 40/30; G06F 16/00; G06F 16/9535; G06Q 30/02
  USPC ........................................................ 709/206
  See application file for complete search history.

(56) References Cited

U.S. PATENT DOCUMENTS

| | | | | |
|---|---|---|---|---|
| 9,710,483 | B1* | 7/2017 | Miller | G06Q 30/00 |
| 10,019,135 | B1* | 7/2018 | Morris | H04L 51/04 |
| 10,333,886 | B2* | 6/2019 | Davis | H04L 51/14 |
| 2004/0015548 | A1* | 1/2004 | Lee | H04L 51/04 |
| | | | | 709/204 |
| 2005/0278430 | A1* | 12/2005 | Cato | G06Q 10/107 |
| | | | | 709/206 |
| 2007/0214058 | A1* | 9/2007 | Rouhi | G06Q 30/0242 |
| | | | | 705/26.1 |
| 2008/0059649 | A1* | 3/2008 | Bradley | G06Q 10/109 |
| | | | | 709/232 |
| 2008/0109429 | A1* | 5/2008 | Petrin | G06F 16/335 |
| 2009/0150373 | A1* | 6/2009 | Davis | H04L 67/125 |
| | | | | 707/999.005 |
| 2009/0150501 | A1* | 6/2009 | Davis | H04W 64/00 |
| | | | | 709/206 |
| 2009/0307592 | A1* | 12/2009 | Kalanithi | H04L 65/403 |
| | | | | 715/763 |
| 2009/0327915 | A1* | 12/2009 | Holdaway | G06F 9/451 |
| | | | | 707/999.001 |
| 2010/0027527 | A1* | 2/2010 | Higgins | G06Q 30/02 |
| | | | | 370/351 |
| 2010/0049702 | A1* | 2/2010 | Martinez | H04L 51/10 |
| | | | | 707/913 |
| 2010/0049807 | A1* | 2/2010 | Thompson | G06Q 10/107 |
| | | | | 709/206 |
| 2012/0089686 | A1* | 4/2012 | Meister | H04L 29/08072 |
| | | | | 709/206 |
| 2013/0054306 | A1* | 2/2013 | Bhalla | G06Q 30/02 |
| | | | | 705/7.31 |
| 2014/0112319 | A1* | 4/2014 | Morris | H04L 51/12 |
| | | | | 370/338 |
| 2014/0237570 | A1* | 8/2014 | Shishkov | G06F 21/316 |
| | | | | 726/7 |
| 2014/0282086 | A1* | 9/2014 | Shi | H04M 1/72436 |
| | | | | 715/752 |
| 2014/0304346 | A1* | 10/2014 | Song | H04L 51/12 |
| | | | | 709/206 |
| 2015/0248534 | A1* | 9/2015 | Krzywicki | G06F 3/04847 |
| | | | | 715/771 |
| 2015/0312197 | A1* | 10/2015 | Dong | H04L 51/28 |
| | | | | 715/752 |
| 2016/0373165 | A1* | 12/2016 | Augusto Di Grandi Nery | H04W 76/14 |
| 2017/0041275 | A1* | 2/2017 | Downing | H04L 63/168 |
| 2017/0068904 | A1* | 3/2017 | Korycki | G06N 20/00 |
| 2017/0177712 | A1* | 6/2017 | Kopru | G06F 16/3337 |
| 2017/0180284 | A1* | 6/2017 | Smullen | H04L 67/306 |
| 2017/0228463 | A1* | 8/2017 | Sharma | G06F 16/9535 |
| 2018/0212904 | A1* | 7/2018 | Smullen | H04L 67/322 |
| 2021/0374569 | A1* | 12/2021 | Jezewski | G06F 40/247 |

FOREIGN PATENT DOCUMENTS

| | | |
|---|---|---|
| CN | 105095366 A | 11/2015 |
| CN | 105450853 A | 3/2016 |
| CN | 105681160 A | 6/2016 |
| CN | 105955566 A | 9/2016 |
| WO | 2015078291 A1 | 6/2015 |
| WO | WO-2021217049 A1 * 10/2021 ............. H04L 51/08 |

OTHER PUBLICATIONS

PCT International Search Report and Written Opinion issued in International Application No. PCT/CN2017/074549 dated Aug. 17, 2017, 19 pages (with English translation).
Office Action issued in Chinese Application No. 201780057747.2 dated May 13, 2020, 22 pages (With English Translation).

* cited by examiner

INFORMATION PROMPT METHOD AND APPARATUS

CROSS-REFERENCE TO RELATED APPLICATIONS

This application is a national stage of International Application No., PCT/CN2017/074549, filed on Feb. 23, 2017, which claims priority to Chinese Patent Application No. 201611160430.5, filed on Dec. 15, 2016, Both of the aforementioned applications are hereby incorporated by reference in their entireties.

TECHNICAL FIELD

The present invention relates to the computer field, and in particular, to an information prompt method and apparatus.

BACKGROUND

With development of information technologies, in daily life and work, in addition to a face-to-face communication mode, non-face-to-face communication modes such as a social application (for example, WeChat, QQ, or 263) and an email are added to communication modes for people. For example, text information, a picture, and the like are sent by using a social application and an email. This brings great convenience to work and life of people.

A social application communication mode and an email communication mode in conventional modes bring convenience to a user; however, also bring some troubles to the user, for example, sending information by mistake. Using instant messaging as an example, when a user uses instant messaging, the user usually sends messages to a plurality of persons or groups. Sometimes, because the user clicks an incorrect dialog box by mistake, information is sent by mistake. For example, a user A chats with two friends (for example, a user B and a user C) at the same time. In a case of having not carefully seen a name of a dialog box, the user A may send, to the user C, information that should be sent to the user B, causing that the information is sent by mistake. Alternatively, when a user replies to an email, because email addresses of two contacts are similar, for example, only one or two letters are different in the email addresses, the user may select an incorrect email address. A user A may send, to a user C, an email that should be sent to a user B, causing that the information is sent by mistake.

To sum up, when information is sent in the social application or email mode in the conventional modes, private information or confidential information may be leaked because the information is sent by mistake.

SUMMARY

Embodiments of the present invention provide an information prompt method and apparatus, to reduce a probability of sending input information to an incorrect communication object, ensure accuracy of sending the input information, and further prevent user information (for example, a password or an identity card number) from being sent to an incorrect communication object to leak the user information.

According to a first aspect, an embodiment of the present invention provides an information prompt method, including: selecting a first communication object from a target communication object set, where a communication object is an object exchanging data in a target application, for example, in a "WeChat" application scenario, a communication object may be contact information in WeChat; in an "email" application scenario, a communication object may be stored address information of a contact; and in an "SMS message" application scenario, a communication object may be phone number information stored in a mobile phone; and then, obtaining first interaction information corresponding to the first communication object, where the first interaction information may include but is not limited to text information, voice information, image information, and the like. It should be noted that, if the first interaction information is voice information, a speech recognition technology needs to be used to convert the voice information into processable text information. If the first interaction information is image information, key information in an image may be extracted by using an image recognition technology, the key information may be information in the image recognized by using an image processing technology, and the image is mapped to a text by using a trained model, thereby generating a keyword. Input information is received by using an information input interface of the first communication object; a matching degree between the input information and the first communication object is determined based on the input information and the first interaction information; and if the matching degree is less than a first threshold, it indicates that the input information does not match the first communication object, prompt is performed, so as to prompt a user that the input information may be sent to an incorrect communication object. In this embodiment, analysis is performed based on the input information and the first interaction information corresponding to the first communication object, the matching degree between the input information and the first communication object may be determined, and the matching degree may be used to indicate a matching situation of the input information and the first communication object. Therefore, when the input information does not match the first communication object, prompt is performed, so that the user may confirm, based on the prompt, whether the input information is sent to a correct communication object, thereby greatly reducing a probability of sending the input information to an incorrect communication object.

In a possible implementation, a specific manner of determining a matching degree between the input information and the first interaction information based on the input information and the first interaction information may be: performing contextual semantic analysis on the input information and the first interaction information, and analyzing the first interaction information by using a neural network language model of deep learning, where the neural network language model is obtained in advance by leaning and training a large quantity of terms and sentences, the neural network language model may be a model used to calculate a probability of generating a sentence or a term, the first interaction information is used as an input of the neural network language model, the language model performs text analysis on the first interaction information, and then the neural network model calculates a predicted correlation between a sentence and the input information; and then, determining the matching degree between the input information and the first communication object based on the correlation. In this embodiment, after the first interaction information is obtained, when the input information is received, the input information and the first interaction information form a context. It may be understood that, the input information is "following text", and the first interaction information is "preceding text". Usually, a situation of conforming to language logic is that semantic meanings expressed by the context are in one language environment. In this embodiment of the present invention, the matching degree between the input information and the first communication object is determined by determining whether the input information and the first interaction information are in one language environment. If the matching degree is low, it indicates that "the preceding text does not match the following text", and it may be determined that the input information may be sent to an incorrect communication object. According to the solution in this embodiment, whether the input information is sent to an incorrect communication object is determined based on the language logic, determining accuracy is relatively high, and applicable application scenarios are wide.

In a possible implementation, a specific manner of determining a matching degree between the input information and the first communication object based on the input information and the first interaction information may be further: extracting a keyword that is used to represent an object relationship and that is in the first interaction information, where the object relationship is used to indicate an interpersonal relationship between a user and an object, for example, the object relationship may be a lover relationship, a colleague relationship, a relative relationship, or the like; then analyzing the keyword by using an object model, and determining a target object relationship corresponding to the first communication object, where the object model is obtained by leaning and training a keyword set for describing the object relationship, and the object model includes a function relationship between a keyword and an object relationship; therefore, the keyword may be used as an input of the object model, an output of the object model is the target object relationship; and determining the matching degree between the input information and the first communication object based on the target object relationship. It may be understood that, in this embodiment, if the matching degree is low, it indicates that the input information is not sent to an appropriate object. For example, a "password" is not suitable for being sent to a communication object of the "colleague relationship". In this embodiment, whether the input information is sent to an appropriate object is determined based on the determined target object relationship. This may effectively avoid a problem of leaking personal security information caused because the input information is sent to an incorrect object. Moreover, the object model in this embodiment may update and learn a keyword that is used correlatively to indicate an object relationship and that is currently newly generated, and accuracy of the determined target object relationship is relatively high.

In a possible implementation, a specific manner of determining a matching degree between the input information and the first communication object based on the input information and the first interaction information may be: extracting a keyword that is used to represent an object relationship and that is in the first interaction information; performing matching between the keyword and a plurality of preset object relationship templates, and determining a target object relationship corresponding to the first communication object, where each of the plurality of object relationship templates includes a keyword set used to represent an object relationship, where for example, the plurality of object relationship templates include a spouse relationship template, a superior-subordinate relationship template, a mother-child relationship template, and the like; and determining the matching degree between the input information and the first communication object based on the target object relationship. In this embodiment, whether the input information is sent to an appropriate object is determined based on the determined target object relationship. This may effectively avoid a problem of leaking personal security information caused because the input information is sent to an incorrect object.

In a possible implementation, before the selecting a first communication object from a target communication object set, the method further includes: a method for determining a target communication object, and the method for determining a target communication object may be specifically: determining a plurality of communication objects, and recording a time stamp of a last piece of interaction information corresponding to each of the plurality of communication objects; and determining, if a difference parameter between the time stamp and a current moment is less than a second threshold, that a communication object corresponding to the time stamp is a target communication object. In this embodiment, target communication objects may be a set of communication objects with which the user is currently communicating, and when the user performs information exchange with a plurality of target communication objects, accuracy of sending the input information is ensured, thereby preventing user information (for example, a password or an identity card number) from being sent to an incorrect communication object to leak the user information.

In a possible implementation, second interaction information corresponding to other communication objects than the first communication object in the target communication object set is obtained; then matching degrees between the input information and the other communication objects are determined based on the input information and the second interaction information, and then a second communication object in the other communication objects is determined, where a matching degree between the second communication object and the input information is highest, and the second communication object may be understood as a communication object to which the input information should be sent; and then it is prompted that the second communication object is a communication object corresponding to the input information. In this embodiment, a correct communication object to which the input information should be sent is prompted to the user by prompting the second communication object, where the matching degree between the second communication object and the input information is high, the user does not need to search for the correct communication object again, to save operation steps of the user, be more intelligent, and save operation time of the user.

In a possible implementation, a specific manner of prompting that the second communication object is a communication object corresponding to the input information may be: displaying an identifier of the second communication object, where the identifier includes at least one of a communication address, an address link, a name, and an icon of the second communication object. The identifier is an identifier of the second communication object that the user may recognize, so that the user may confirm, based on the identifier of the second communication object, whether the second communication object to which the input information should be sent is correct.

In a possible implementation, after the displaying an identifier of the second communication object, the method may further include the following steps: generating a first confirmation instruction in response to a confirmation operation on the identifier; then switching, according to the first confirmation instruction, the information input interface correspondingly to the second communication object; and copying the input information to an information input interface of the second communication object, so as to send the input information to a correct communication object. In this embodiment, switching to an information input interface of a communication object may be automatically performed based on prompt information, where a matching degree between the communication object and the input information is high, the user does not need to enable the information input interface of the second communication object again or to enter the input information again, to reduce operation steps of the user, be more intelligent, and save operation time of the user.

In a possible implementation, a second confirmation instruction for sending the input information is received if the matching degree is greater than or equal to the first threshold; and the input information is sent to a server according to the second confirmation instruction. In this embodiment, if the matching degree is less than the first threshold, user equipment rejects receiving the second confirmation instruction entered by the user. For example, in a "WeChat" application scenario, if the matching degree is less than the first threshold, an "enter" button is not started, and the "enter" button is started only when the matching degree is greater than or equal to the first threshold, to allow receiving the second confirmation instruction entered by the user, and the user equipment sends the input information to the server according to the second confirmation instruction, so that the server sends the input information to the first communication object.

In a possible implementation, after the receiving input information by using an information input interface of the first communication object, and before the analyzing the input information and the first interaction information, the method may further include the following steps: receiving a second confirmation instruction for sending the input information; then analyzing the input information and the first interaction information according to the second confirmation instruction, and obtaining the matching degree between the input information and the first communication object; and rejecting, when the matching degree is less than the first threshold, sending the input information to a server. In this embodiment, the first interaction information does not match the input information in real time, and instead after the input information is received by using the information input interface of the first communication object, the second confirmation instruction that is used for sending the input information and that is entered by the user is received. When receiving the second confirmation instruction, user equipment temporarily does not send the input information to the server, and instead analyzes the input information and the first interaction information according to the second confirmation instruction, obtains the matching degree between the input information and the first communication object, and rejects, if the matching degree is less than the first threshold, sending the input information to the server.

According to a second aspect, an embodiment of the present invention provides an information prompt apparatus, having a function that is actually performed by an apparatus and that implements the foregoing method. The function may be implemented by using hardware, or may be implemented by hardware by executing corresponding software. The hardware or software includes one or more modules corresponding to the foregoing function.

According to a third aspect, a structure of an information prompt apparatus includes a memory, a transceiver, and a processor. The memory is configured to store computer executable program code and is coupled to the transceiver. The program code includes an instruction, and when the processor executes the instruction, the instruction enables the apparatus to execute information or an instruction used in the method in the first aspect.

According to a fourth aspect, an embodiment of the present invention provides a computer storage medium, configured to store a computer software instruction used by the foregoing information prompt apparatus, where the computer storage medium includes a program designed to execute the first aspect.

According to a fifth aspect, an embodiment of the present invention provides an information prompt method, including: selecting a first communication object from a target communication object set, and then receiving input information by using an information input interface of the first communication object; determining a target object relationship corresponding to the first communication object, where an object relationship is used to indicate an interpersonal relationship between a user and an object, where for example, the object relationship may be a "spouse relationship", a "colleague relationship", a "friend relationship", or the like; determining the matching degree between the input information and the first communication object based on the target object relationship; and performing prompt if the matching degree is less than a first threshold. In this embodiment, whether the input information is sent to an appropriate object is determined by using an object relationship, and if the input information is not suitable for being sent to the first communication object corresponding to the target object relationship, prompt is performed, so as to prompt the user that the input information may be sent to an incorrect communication object, thereby greatly reducing a probability of sending the input information to an incorrect communication object.

In a possible implementation, before the determining a target object relationship corresponding to the first communication object, the method further includes: a specific manner about how to obtain the target object relationship, each object relationship and a communication object are correlatively stored, and a specific manner of determining an object relationship is: obtaining interaction information corresponding to each communication object of target communication objects; then determining an object relationship corresponding to the communication object based on the interaction information; and then correlatively storing the object relationship and the corresponding communication object. It may be understood that, an object relationship is determined based on historical interaction information of a communication object, and then the object relationship and the communication object are correlatively stored. In this way, provided that a specific target object is determined, a target object relationship corresponding to the target object may be obtained. For example, if a boyfriend (whose name is A) of a user is a first communication object, it may be determined, by using historical information of the user and the boyfriend, that A and the user are in a lover relationship, and the lover relationship and A are correlatively stored, it may be determined that an object relationship between the user and A is the lover relationship when input information is received.

In a possible implementation, a specific implementation of determining an object relationship corresponding to the communication object based on the interaction information may be: extracting a keyword that is used to represent an object relationship and that is in the interaction information; and determining, based on an object model and the keyword, the object relationship corresponding to the communication object, where the object model is obtained by leaning and training a keyword set for describing the object relationship. The object model includes a function relationship between a keyword and an object relationship, and the object model continuously performs learning and update. For example, as time elapses, different keywords may be generated for a title of a same thing or person, and the object model may establish an updated object relationship for learning a keyword.

In a possible implementation, a corresponding first security level is set for each object relationship; the first security level and the corresponding object relationship are correlatively stored; the input information is evaluated by using a security evaluation model, and it is learned that a security level of the input information is a second security level, where the security evaluation model is obtained by performing learning and training in advance on a keyword set used to indicate user information; and matching is performed based on the first security level corresponding to the target object relationship and the second security level, and the matching degree between the input information and the first communication object is obtained. In this embodiment, if a matching degree between the security level of the input information and a security level of the target object relationship is relatively high, it indicates that the input information may be sent to a communication object corresponding to the target object relationship. In this embodiment, security information of the user, for example, information such as an account or a password is more sensitive. If a security level of input information is high, but in this case, the input information is sent to a communication object corresponding to a target object relationship whose security level is low, prompt is performed, so as to prevent user information from being leaked.

In a possible implementation, a specific manner of determining a target object relationship corresponding to the first communication object may be further: obtaining a name of the first communication object, where in some application scenarios, the name of the communication object is stored in an application, for example, a name of a contact such as "colleague Xiao Li" is stored in WeChat; determining the target object relationship corresponding to the first communication object based on the name of the first communication object, where it may be determined, by using the name of the first communication object, that an object relationship between the user and "Xiao Li" is the "colleague relationship". In this embodiment, a target object relationship is determined by using a name of a communication object, an implementation is simple, and a correctness percentage is high.

In a possible implementation, a specific method for determining the matching degree may be: correspondingly setting one blacklist for each object relationship, where the blacklist includes a plurality of keywords, and then extracting keywords in the input information; performing matching between the keywords in the input information and the keywords in the blacklist corresponding to the target object relationship, and obtaining a matching result; and determining the matching degree between the input information and the first communication object based on the matching result. In this embodiment, each object relationship corresponds to one blacklist, and this blacklist includes information, where matching cannot be performed between the information and the object relationship. For example, matching cannot be performed between a blacklist corresponding to the colleague relationship and password information. A probability of leaking the user information is reduced.

In a possible implementation, before the prompt is performed, a second object relationship corresponding to other communication objects than the first communication object in the target communication object set is determined, where the second object relationship may be understood as a set of object relationships corresponding to the other communication objects than the first communication object; matching degrees between the input information and the other communication objects are determined based on the second object relationship; then a second communication object in the other communication objects is determined, where a matching degree between the second communication object and the input information is highest, and it is prompted that the second communication object is a communication object corresponding to the input information. The second communication object may be understood as a communication object to which the input information should be sent; and then it is prompted that the second communication object is a communication object corresponding to the input information. In this embodiment, a correct communication object to which the input information should be sent is prompted to the user by prompting the second communication object, where the matching degree between the second communication object and the input information is high, the user does not need to search for the correct communication object again, to save operation steps of the user, be more intelligent, and save operation time of the user.

In a possible implementation, a specific manner of prompting that the second communication object is a communication object corresponding to the input information may be: displaying an identifier of the second communication object, where the identifier includes at least one of a communication address, an address link, a name, and an icon of the second communication object. The identifier is an identifier of the second communication object that the user may recognize, so that the user may confirm, based on the identifier of the second communication object, whether the second communication object to which the input information should be sent is correct.

In a possible implementation, after the displaying an identifier of the second communication object, the method may further include: generating a first confirmation instruction in response to a confirmation operation on the identifier; switching, according to the first confirmation instruction, the information input interface correspondingly to the second communication object; and copying the input information to an information input interface of the second communication object, so as to send the input information to a correct communication object. Switching to an information input interface of a communication object may be automatically performed based on prompt information, where a matching degree between the communication object and the input information is high, the user does not need to enable the information input interface of the second communication object again or to enter the input information again, to reduce operation steps of the user, be more intelligent, and save operation time of the user.

According to a sixth aspect, an embodiment of the present invention provides an information prompt apparatus, having a function that is actually performed by an apparatus and that implements the method in the fifth aspect. The function may be implemented by using hardware, or may be implemented by hardware by executing corresponding software. The hardware or software includes one or more modules corresponding to the foregoing function.

According to a seventh aspect, a structure of an information prompt apparatus includes a memory, a transceiver, and a processor. The memory is configured to store computer executable program code and is coupled to the transceiver. The program code includes an instruction, and when the processor executes the instruction, the instruction enables the apparatus to execute information or an instruction used in the method in the first aspect.

According to an eighth aspect, an embodiment of the present invention provides a computer storage medium, configured to store a computer software instruction used by the foregoing information prompt apparatus, where the computer storage medium includes a program designed to execute the fifth aspect.

According to a ninth aspect, an embodiment of the present invention provides an information prompt method, including: receiving input information sent by first user equipment, where the input information carries an identifier of a first communication object, determining the first communication object based on the identifier of the first communication object, and obtaining first interaction information between the first communication object and a communication object corresponding to the first user equipment; determining a matching degree between the input information and the first communication object based on the input information and the first interaction information; and generating, by a server, prompt information if the matching degree is less than a first threshold, and sending the prompt information to the first user equipment, so that the first user equipment performs prompt based on the prompt information. In this embodiment, the server may determine the matching degree between the input information and the first communication object; and if the matching degree is less than the first threshold, the server generates the prompt information, and then sends the prompt information to the corresponding first user equipment, so as to prompt the user that the input information may be sent to an incorrect communication object. In this embodiment, a step of determining the matching degree between the input information and the first communication object may be performed by the server, so as to reduce calculation steps of the user equipment, and reduce a calculation pressure on the user equipment.

In a possible implementation, when the matching degree is greater than or equal to the first threshold, the input information is sent to second user equipment corresponding to the first communication object.

According to a tenth aspect, an embodiment of the present invention provides an information prompt method, including: receiving input information sent by first user equipment, where the input information carries an identifier of a first communication object, then determining the first communication object based on the identifier of the first communication object, and determining a target object relationship between the first communication object and a communication object corresponding to the first user equipment; determining the matching degree between the input information and the first communication object based on the target object relationship; and generating prompt information if the matching degree is less than a first threshold, and sending the prompt information to the first user equipment, so that the first user equipment performs prompt based on the prompt information. In this embodiment, a server determines the target object relationship between the first communication object and the communication object corresponding to the first user equipment, and then determines the matching degree between the input information and the first communication object based on the target object relationship and the input information; and if the matching degree is less than the first threshold, the server generates the prompt information, and then sends the prompt information to the corresponding first user equipment, so as to prompt the user that the input information may be sent to an incorrect communication object. In this embodiment, a step of determining the matching degree between the input information and the first communication object may be performed by the server, so as to reduce calculation steps of the user equipment, and reduce a calculation pressure on the user equipment.

In a possible implementation, if the matching degree is greater than or equal to the first threshold, the input information is sent to second user equipment corresponding to the first communication object.

According to an eleventh aspect, an embodiment of the present invention provides a server, and a structure of the server includes a memory, a network interface, and a processor. The memory is configured to store computer executable program code and is coupled to the network interface. The program code includes an instruction, and when the processor executes the instruction, the instruction enables the apparatus to execute information or an instruction used in the method in the ninth aspect or the tenth aspect.

According to a twelfth aspect, an embodiment of the present invention provides a computer storage medium, configured to store a computer software instruction used by the server provided in the eleventh aspect, where the computer storage medium includes a program designed to execute the ninth aspect.

According to a thirteenth aspect, an embodiment of the present invention provides a computer storage medium, configured to store a computer software instruction used by the server provided in the eleventh aspect, where the computer storage medium includes a program designed to execute the tenth aspect.

DESCRIPTION OF EMBODIMENTS

Figure 1:
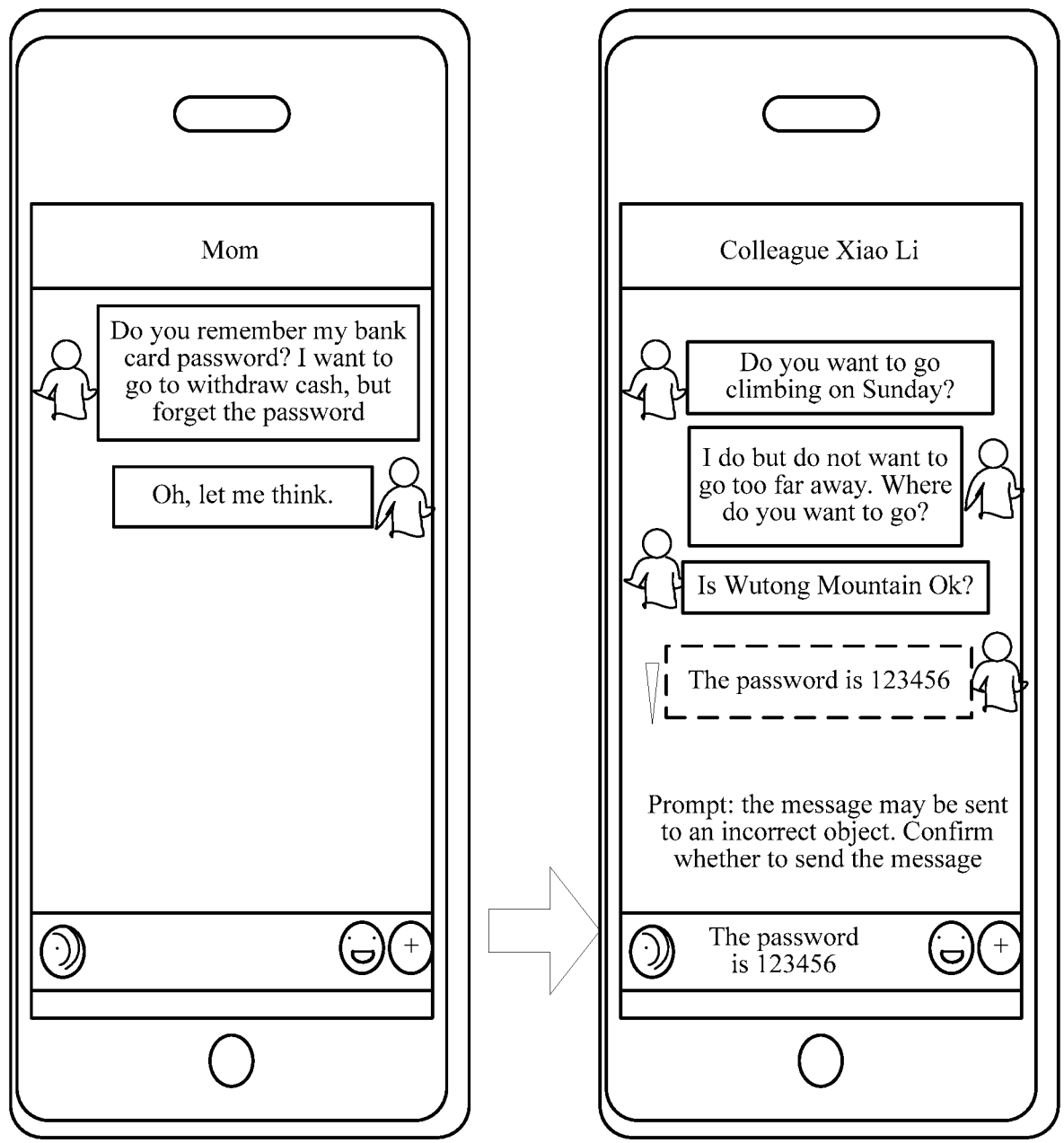
FIG. 1 is a schematic diagram of a scenario of an embodiment of an information prompt method according to an embodiment of the present invention.

Embodiments of the present invention provide an information prompt method and apparatus, to reduce a probability of sending input information to an incorrect communication object, ensure accuracy of sending the input information, and further prevent user information from being sent to an incorrect communication object to leak the user information.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The embodiments of the present invention provide an information prompt method, the method may be applied to user equipment, and the user equipment includes a mobile phone, a tablet computer, a personal digital assistant (Personal Digital Assistant, PDA for short), or the like. In the embodiments of the present invention, description is made by using an example in which the user equipment may be a mobile phone.

The embodiments of the present invention provide an information prompt method. Specifically, the method may be applied to a target application in user equipment, and the target application may be a social application (for example, WeChat or QQ), an SMS message, an email, or the like. During actual application, a target application to which the method is applied is not limited.

For convenience of understanding, terms used in the embodiments of the present invention are explained and described.

Communication object: it is an object performing data exchange in a target application. For example, in a "WeChat" application scenario, a communication object may be contact information in WeChat; in an "email" application scenario, a communication object may be stored address information of a contact; and in an "SMS message" application scenario, a communication object may be phone number information stored in a mobile phone.

Target communication object: it is a communication object that may satisfy a preset condition among a plurality of communication objects. The preset condition may differ based on different application scenarios. In a first manner, the preset condition is that a range of target communication objects is the same as that of a plurality of communication objects. For example, all contacts in mobile phone WeChat are target communication objects.

In a second manner, the preset condition is that a difference parameter between a time stamp of a last piece of interaction information corresponding to a communication object and a current moment is less than a second threshold. A specific manner of determining a target communication object may be:

first determining a plurality of communication objects, and recording a time stamp of a last piece of interaction information corresponding to each of the plurality of communication objects; and determining, if a difference parameter between the time stamp and a current moment is less than a second threshold, that a communication object corresponding to the time stamp is a target communication object. For convenience of understanding, description is made by using an example of a "WeChat" application scenario.

The plurality of communication objects may be all contacts in mobile phone WeChat of a user A. For example, the mobile phone WeChat of the user A includes four contacts that are respectively B, C, D, and E. It should be noted that, a quantity of communication objects in WeChat is only an example used for convenience of description, and is not intended to limitatively describe the present invention. A time stamp of a last piece of interaction information of each of the four communication objects is recorded. A time stamp of a last piece of interaction information corresponding to B is "10:30, Jan. 27, 2017". A time stamp of a last piece of interaction information corresponding to C is "10:51, Jan. 27, 2017". A time stamp of a last piece of interaction information corresponding to D is "10:52, Jan. 27, 2017". A time stamp of a last piece of interaction information corresponding to E is "10:53, Jan. 27, 2017". A current moment displayed by user equipment is "10:55, Jan. 27, 2017". A difference parameter between a time stamp of a last piece of interaction information corresponding to each communication object and the current moment is determined. The difference parameter in the embodiments of the present invention may be a difference value, or may be a product of a difference value and a coefficient or the like. During actual application, the difference parameter may include a plurality of variants that are not listed one by one in the embodiments of the present invention. In the embodiments of the present invention, description is made by using an example in which the difference parameter may be a difference value.

A threshold preset. To perform distinguishing, the threshold may be referred to as a second threshold. For example, the second threshold may be five minutes. If a difference value between a time stamp of a last piece of interaction information corresponding to a communication object and a current moment is less than five minutes, the communication object is a target communication object. Specifically, understanding is performed with reference to Table 1:

TABLE 1

| Communication object | Time stamp | Second threshold | Difference value | Target communication object |
|---|---|---|---|---|
| B | 10:30 | Five minutes | 15 minutes | No |
| C | 10:51 | minutes | Four minutes | Yes |
| D | 10:52 | | Three minutes | Yes |
| E | 10:53 | | Two minutes | Yes |

It may be learned from Table 1 that, communication objects C, D, and E are target communication objects, and it may also be understood that the target communication objects C, D, and E form a target communication object set.

It should be noted that, in this embodiment, the second threshold (for example, five minutes) is described by using only an example, and is not intended to limitatively describe the present invention. In different application scenarios, the second threshold may be set to different values based on actual situations. For example, in the "email" application scenario, the second threshold may be set to five hours. To be specific, compared with the current moment, a communication object corresponding to an email received within five hours before the current moment is a target communication object. Interaction information: it is information received or sent at the time of performing data exchange with a communication object, and the interaction information may be text information, voice information, or image information. For example, in the "WeChat" application scenario, in a process of chatting with Xiao Li, a user may send text information, voice information, image information, or the like to Xiao Li by using "WeChat" or receive, by using "WeChat", text information, voice information, image information, or the like sent by Xiao Li. Specifically, the text information may be text information entered by the user or the text information may be carried in different carriers, the carrier may be a "red envelope", a we-media message, or the like, and the text information may be a "red envelope", a message forwarded from another application, a we-media message in moments, text information in a piece of news in Toutiao, or the like.

Understanding is performed with reference to FIG. 1, and FIG. 1 is a schematic diagram of a scenario in an embodiment of the present invention. An embodiment of an information prompt method provided in this embodiment of the present invention includes:

A first communication object is selected from a target communication object set, where the target communication object set includes at least one first communication object. It should be noted that, the first communication object is relative and changed, and the first communication object is a communication object corresponding to a current information input interface. For example, the target communication object set includes two communication objects that are respectively a communication object Q and a communication object P. If a communication object corresponding to the current information input interface in WeChat is Q, the communication object Q is the first communication object. If a communication object corresponding to the current information input interface in WeChat is P, the communication object P is the first communication object.

First interaction information corresponding to the first communication object is obtained, where the first interaction information may be all historical interaction information corresponding to the first communication object; historical interaction information within a preset period of time, for example, historical interaction information obtained within one hour before a current moment in a time order; or a preset quantity of historical interaction information. For example, the preset quantity is 5, a last piece of interaction information corresponding to the first communication object is used as a first piece of interaction information, and four pieces of information before the last piece of interaction information are obtained as the first interaction information in a time order of receiving and sending information; or the first interaction information is a last piece of information corresponding to the first communication object.

Input information is received by using the information input interface of the first communication object, where the input information may be text information, image information, or voice information. The text information may be text information in a "red envelope", text information in a multimedia message, or the like, the input information may be understood with reference to interaction information, and details are not described herein.

Then, a matching degree between the input information and the first communication object is determined based on the input information and the first interaction information; and prompt is performed if the matching degree is less than a first threshold, so as to prompt a user that the input information may be sent to an incorrect communication object.

Description is made by using a "WeChat" application scenario as an example, and understanding is performed with reference to the schematic diagram of the scenario in FIG. 1.

A user chats with "mom" and "colleague Xiao Li" by using "WeChat", and contacts "mom" and "colleague Xiao Li" in WeChat in a mobile phone of the user A form a target communication object set. The user switches between an information input interface corresponding to "mom" and an input interface corresponding to "colleague Xiao Li", and the user chats with "mom" and "colleague Xiao Li" at different moments respectively.

An example of historical chat records between the user and "mom" and between the user and "colleague Xiao Li" is as follows:

Colleague Xiao Li: Do you want to go climbing on Sunday? (moment: 10:10:05)

The user A replies to the colleague Xiao Li: I do but do not want to go too far away. Where do you want to go? (moment: 10:10:09)

Mom: Do you remember my bank card password? I want to go to withdraw cash, but forget the password. (moment: 10:10:11)

Colleague Xiao Li: Is Wutong Mountain Ok? (moment 10:10:15)

The user A replies to the mom: Oh, let me think. (moment: 10:10:30)

The user A replies to Xiao Li: the password is 123456. (moment: 10:10:40)

Based on the foregoing example of the interaction information, an example of determining the matching degree is shown in Table 2:

TABLE 2

| | Moment | Interaction information | Perform matching between first interaction information and input information | Matching degree |
|---|---|---|---|---|
| Colleague Xiao Li | 10:10:05 | Do you want to go climbing on Sunday? | | |
| Replay to colleague Xiao Li | 10:10:09 | I do but do not want to go too far away. Where do you want to go? (input information) | Determine a matching degree based on "Do you want to go climbing on Sunday?" and "I do but do not want to go too far away. Where do you want to go?" | 5 |
| Mom | 10:10:11 | Do you remember my bank card password? I want to go to withdraw cash, but forget the password. | | |
| Colleague Xiao Li | 10:10:15 | Is Wutong Mountain Ok? (input information) | Determine a matching degree based on "I do but do not want to go too far away. Where do you want to go?" and "Is Wutong Mountain Ok?" | 4 |
| Reply to mom | 10:10:30 | Oh, let me think. (input information) | Determine a matching degree based on "Do you remember my bank card password? I want to go to withdraw cash, but forget the password." and "Oh, let me think." | 4 |
| Reply to Xiao Li | 10:10:40 | The password is 123456. | based on "Is Wutong Mountain Ok?" and "The password is 123456." | 0 |

It may be learned from the example in Table 2 that, the matching degree between "The password is 123456" with which the user replies to "colleague Xiao Li" on "10:10:40" and "Is Wutong Mountain Ok?" is 0. If the first threshold is preset to 1, the matching degree is less than the first threshold. When receiving the input information "The password is 123456" on an information input interface of "colleague Xiao Li", user equipment performs prompt, so as to prompt the user that the input information may be sent to an incorrect communication object.

This embodiment of the present invention may also be applied to an "email" application scenario, a target communication object set is all address information corresponding to emails, a first communication object selected from the target communication object set is "zhaojian@163.com", first interaction information corresponding to the first communication object that is obtained is: "Xiao Zhao, hello, how is the blueprint going?", input information received by using an information input interface corresponding to "zhaojian@163.com" is "Mr. Zhao, hello, the work plan has been completed. Please check", matching is performed between the first interaction information and the input information, and a determined matching degree is "0" If the first threshold is preset to 1, the matching degree is less than the first threshold. When receiving the input information "Mr. Zhao, hello, the work plan has been completed. Please check" on an information input interface of "colleague Xiao Li", user equipment performs prompt, so as to prompt the user that the input information may be sent to an incorrect communication object.

It should be noted that, each of the matching degree, the first threshold, the interaction information, the input information, and the like in the foregoing example is described as an example for convenience of description, and is not intended to limitatively describe the present invention.

According to the information prompt method provided in this embodiment of the present invention, the matching degree between the input information and the first interaction information may be determined based on the input information received by the information input interface of the first communication object and the first interaction information corresponding to the first communication object; and prompt is performed if the matching degree is less than the first threshold, so as to prompt the user that the communication object corresponding to the input information may be incorrect, to reduce a probability of sending the input information to an incorrect communication object, and particularly at the time of performing information exchange with a plurality of target communication objects, ensure accuracy of sending the input information, thereby preventing user information (for example, a password or an identity card number) from being sent to an incorrect communication object to leak the user information.

Figure 2:
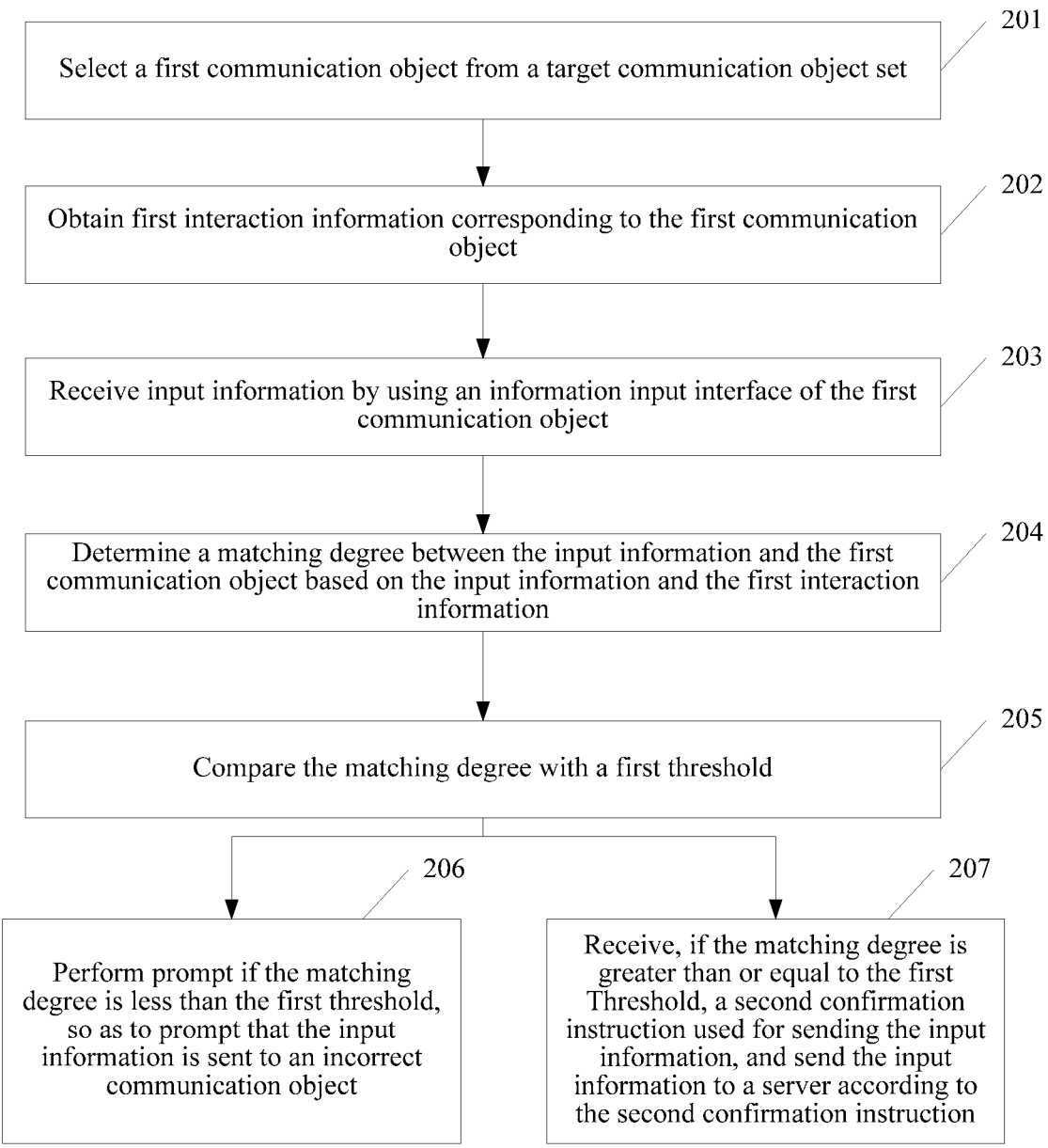
FIG. 2 is a schematic flowchart of steps of an embodiment of an information prompt method according to an embodiment of the present invention.

An information prompt method provided in an embodiment of the present invention is described below in detail. Referring to FIG. 2, an embodiment of the information prompt method provided in this embodiment of the present invention includes the following steps.

Step 201: Select a first communication object from a target communication object set.

An instruction that is used for determining the first communication object and that is entered by a user is received, and the first communication object is selected from the target communication object set based on the instruction.

In this embodiment of the present invention, a specific method for determining a target communication object may be: determining a plurality of communication objects, where the plurality of communication objects may be all communication objects in a social application, and then recording a time stamp of a last piece of interaction information corresponding to each of the plurality of communication objects; and determining, if a difference parameter between the time stamp and a current moment is less than a second threshold, that a communication object corresponding to the time stamp is a target communication object, where the difference parameter may be described by using a difference value as an example. For example, the second threshold is five minutes, and a communication object for which the difference value is less than five minutes is a target communication object. To be specific, a communication object having information exchanged within five minutes before the current moment is a target communication object. For example, in a "WeChat" application scenario, target communication objects include "mom" and "colleague Xiao Li". If user equipment receives an instruction that is used for determining a communication object and that is entered by the user when the user clicks an icon of "mom", it is determined, based on the instruction, that "mom" is a first communication object, and an information input interface of the first communication object is presented.

Step 202: Obtain first interaction information corresponding to the first communication object.

The first interaction information is historical interaction information corresponding to the first communication object. For example, in the example of Table 2, first interaction information corresponding to "colleague Xiao Li" may be three pieces of historical interaction information, namely, "Do you want to go climbing on Sunday?", "I do but do not want to go too far away. Where do you want to go?", and "Is Wutong Mountain Ok?". In another possible implementation, the first interaction information may alternatively be a last piece of interaction information, namely, "Is Wutong Mountain Ok?". During actual application, an information quantity of the first interaction information is not limited in this embodiment of the present invention.

The first interaction information may include but is not limited to text information, voice information, image information, and the like. It should be noted that, if the first interaction information is voice information, a speech recognition technology needs to be used to convert the voice information into processable text information. If the first interaction information is image information, key information in an image may be extracted by using an image recognition technology, the key information may be information in the image recognized by using an image processing technology, and the image is mapped to a text by using a trained model, thereby generating a keyword.

When the first interaction information is text information, the text information may be text information directly entered by the user, or the text information may be carried in different carriers. For example, the carriers may be a "red envelope", a "we-media message", and the like, and if text information is carried in carriers such as a "red envelope" and a "we-media message", the text information needs to be extracted from the carriers. For example, in the "WeChat" application scenario, if the user sends a "red envelope" to "mom", and adds text information "mom, happy birthday" to the "red envelope", the text information in the red envelope needs to be extracted.

Step 203: Receive input information by using an information input interface of the first communication object.

The input information may include but is not limited to text information, voice information, and image information, a form of the input information may be understood with reference to description on the interaction information in step 201, and details are not described herein.

It should be noted that, a time sequence between step 202 and step 203 is not limited, and step 203 may alternatively be before step 202.

Step 204: Determine a matching degree between the input information and the first communication object based on the input information and the first interaction information.

The matching degree is used to indicate a matching extent between the first interaction information and the input information. A method for determining a matching degree between the input information and the first communication object may be specifically:

In a first possible implementation, contextual semantic analysis is performed on the input information and the first interaction information, and a correlation between the input information and a context of the first interaction information is obtained. There are many semantic analysis methods, and in this embodiment, semantic analysis is simply described by using an example. The first interaction information is analyzed by using a neural network language model of deep learning, where the neural network language model is obtained in advance by leaning and training a large quantity of terms and sentences, the neural network language model may be a model used to calculate a probability of generating a sentence or a term, the first interaction information is used as an input of the neural network language model, the language model performs text analysis on the first interaction information. The first interaction information may be first split. For example, the first interaction information is "do you want to go climbing, do not want to go too far away, where do you want to go?", the first interaction information is split, word vectors such as "go", "go climbing", "do not want to go", "too far away", "you", and "where do you want to go?" are introduced, then a relationship between the word vectors, such as a synonym or an antonym is mined, and then a term or a sentence to be generated is predicted by using a neural network. For example, a sentence predicted by using the neural network language model is: "I do, and I want to go to Qing Mountain", or "I do not want to go". When the input information is "I do, and I want to go to Wutong Mountain", the neural network model then calculates a correlation between the predicted sentence and the input information. For example, in the sentence predicted by using the neural network language model and the sentence in the input information, only words "Qing Mountain" and "Wutong Mountain" are different, but the two words are synonyms, and finally the correlation between the first interaction information and the input information is 90% through calculation. It should be noted that, the foregoing method for contextual semantic analysis is described as an example only for convenience of understanding, and is not intended to limitatively describe the present invention. The correlation and the matching degree have a correspondence, and the correlation and the matching degree are positively correlated.

Then, the matching degree between the input information and the first communication object is determined based on the correlation. For example, if calculation is performed by using a standard in which a matching degree corresponding to a correlation being 100% is 5, a matching degree corresponding to a correlation being 90% is 4.5. It should be noted that, a manner of determining the matching degree between the input information and the first communication object based on the correlation is described only by using an example, and is not intended to limitatively describe the present invention.

In a second possible implementation, a keyword that is used to represent an object relationship and that is in the first interaction information is extracted. It may be understood that, the object relationship may be an interpersonal relationship between the user and a contact in a "social application" or an "email". For example, the object relationship includes but is not limited to a "colleague relationship", a "lover relationship", a "relative relationship", a "mother-child relationship", a "father-child relationship", a "friend relationship", a "superior-subordinate relationship", a "spouse relationship", and the like.

The keyword is analyzed by using an object model, and a target object relationship corresponding to the first communication object is determined, where the object model is obtained by leaning and training a keyword set for describing the object relationship. For example, if a keyword is "mom", and the keyword "mom" is used as input, a target object relationship output by the object model may be the "mother-child relationship". For another example, if a keyword extracted from the first interaction information is "honey", "husband", "wife", or the like, a target object relationship that corresponds to the first communication object and that is input by the object model may be the "spouse relationship".

Then, the matching degree between the input information and the first communication object is determined based on the target object relationship. This may be performed in several specific manners, which are briefly described below:

1. A keyword in the input information may be first extracted, the keyword in the input information is analyzed by using an object model, a first object relationship corresponding to the first communication object is determined, then matching is performed between the target object relationship and the first object relationship, and a matching degree is obtained. A matching degree between object relationships may be preset, and the matching degree between the object relationships is described below by using an example, referring to Table 3.

TABLE 3

| Target object relationship | First object relationship | Matching degree |
|---|---|---|
| Mother-child relationship | Mother-child relationship | 3 |
| Mother-child relationship | Relative relationship | 2 |
| Mother-child relationship | Spouse relationship | 1 |
| Mother-child relationship | Colleague relationship | 0 |

It should be noted that, Table 3 describes the matching degree by using an example only for purpose of simple and convenient description, and is not intended to limitatively describe the present invention.

It may be learned from Table 3 that, when the target object relationship completely matches the first object relationship, the matching degree is highest and is a first preset value (for example, 3); when the target object relationship and the first object relationship have an association relationship, the matching degree is a second preset value (for example, 2); and an example in which the target object relationship and the first object relationship have an association relationship is further, for example, a "superior relationship" or a "colleague relationship". For another example, a target object relationship may include two or more object relationships, and the object model may correct the object relationships by using a plurality of keywords. It may be understood that, the object model may accurately determine the target object relationship by analyzing the plurality of keywords. For example, keywords that may be included in the first interaction information include keywords such as "honey", "sister", and "friend", it may be determined, by using "honey", that the target object relationship is the "lover relationship" or the "spouse relationship", the keywords further include "sister" and "friend", and finally it is determined that the target object relationship is a "ladybro relationship". The "ladybro relationship" and the "friend relationship" have an association relationship, and therefore, a matching degree between the "ladybro relationship" and the "friend relationship" is the second preset value (for example, 2).

It should be noted that, the object model continuously performs learning and update. For example, as time elapses, different keywords may be generated for a title of a same thing or person. For example, a network catchword "Xianggu, Lanshou" is a term used to indicate a low mood. For another example, a title for a superior may also be "leader", such a keyword as "leader" may be used to determine a "superior-subordinate relationship"; and a title for a mentor may also be "boss", such a keyword as "boss" may be used to determine a "teacher-student relationship" or the like. The object model may establish an updated object relationship for learning a keyword.

2. Each object relationship corresponds to one blacklist, and the blacklist includes keywords. For example, keywords included in a blacklist corresponding to the "colleague relationship" include: keywords used to indicate personal information of a user, such as a password, a bank card, and an account, keywords in input information are extracted, matching is performed between the keywords in the input information and the keywords in the blacklist, and a matching result is obtaining, where the matching result includes whether the keywords in the input information match the keywords in the blacklist, a quantity of matched keywords, and the like. It may be understood that, for example, if the input information includes a keyword in the corresponding blacklist, it is determined that a matching degree is a third preset value (which is a minimum preset value such as "0"). It may be understood that, to reduce a probability of sending the input information to an incorrect object, if the input information includes a keyword in the blacklist, it indicates that a communication object to which the input information is sent may be incorrect.

In this embodiment, whether the input information is sent to an appropriate object is determined based on the determined target object relationship. This may effectively avoid a problem of leaking personal security information caused because the input information is sent to an incorrect object.

Figure 3:
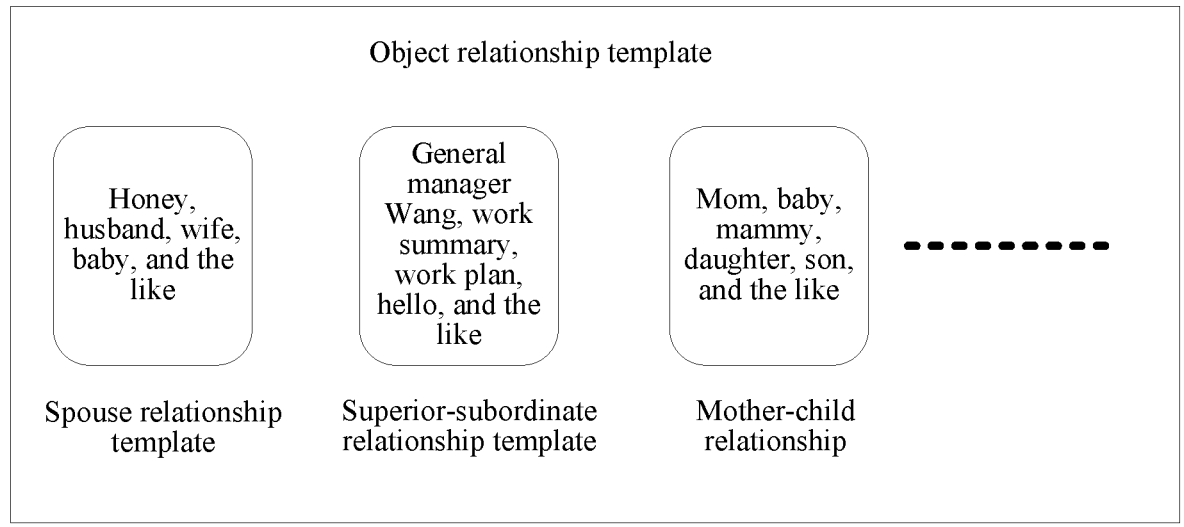
FIG. 3 is a schematic diagram of an object relationship template according to an embodiment of the present invention.

In a third possible implementation, understanding is performed with reference to FIG. 3, and FIG. 3 is a schematic diagram of an object relationship template. A keyword that is used to represent an object relationship and that is in the first interaction information is extracted; and matching is performed between the keyword and a plurality of preset object relationship templates, and a target object relationship corresponding to the first communication object is determined, where each of the plurality of object relationship templates includes a keyword set used to represent an object relationship. For example, the plurality of object relationship templates include a spouse relationship template, a superior-subordinate relationship template, a mother-child relationship template, and the like, where keywords included in the spouse relationship template are: honey, husband, wife, daughter-in-law, and the like. Keywords included in the superior-subordinate relationship template are: Mr. Wang, work summary, work plan, hello, and the like. Keywords included in the mother-child relationship template are: mom, baby, mammy, daughter, son, and the like. For example, in the "WeChat" application scenario, if keywords extracted from the first interaction information include "honey" and "daughter-in-law", matching is performed between the keywords and keywords in the plurality of object relationship templates, and it is determined that the target relationship template is the "spouse relationship". Then, the matching degree between the input information and the first communication object is determined based on the target object relationship.

It should be noted that, the plurality of object relationship templates and a keyword set corresponding to the object relationship templates are described herein only by using an example, and are not intended to limitatively describe the present invention. In this example, a specific implementation of determining the matching degree between the input information and the first communication object based on the target object relationship may be understood with reference to the specific manner of determining the matching degree between the input information and the first communication object based on the target object relationship in the foregoing second implementation, and details are not described herein.

Step 205: Compare the matching degree and a first threshold. If the matching degree is less than the first threshold, step 206 is performed. If the matching degree is greater than or equal to the first threshold, step 207 is performed.

For example, the first threshold may be set to "1". It should be noted that, the matching degree and the first threshold are described only by using an example in this embodiment of the present invention, and are not intended to limitatively describe the present invention.

Step 206: Perform prompt if the matching degree is less than the first threshold, so as to prompt that the input information is sent to an incorrect communication object.

Prompt is performed if the matching degree is less than the first threshold. Prompt manners include but are not limited to sound prompt, buzz prompt, prompt information display, and the like.

Specific methods for prompt information display may be:

In a first possible implementation, understanding is performed with reference to the schematic diagram of the scenario in FIG. 1, the prompt information is directly displayed on the information input interface corresponding to the first communication object, and the prompt information may be text information or may be symbol information. When the prompt information is text information, for example, the prompt information may be that the information may be sent to an incorrect object, whether the prompt information continues to be sent is confirmed.

In a second possible implementation, second interaction information corresponding to other communication objects than the first communication object in the target communication object set is obtained. For example, communication objects included in the target communication set are "colleague Xiao Li", "mom", and "Xiao Zhang", and if the first communication object is "colleague Xiao Li", interaction information respectively corresponding to "mom" and "Xiao Zhang" needs to be obtained. The second interaction information in this embodiment may be interaction information of one communication object, or may be a set of interaction information corresponding to at least two communication objects. In this embodiment, the second interaction information is a set of two pieces of interaction information, and the second interaction information includes the interaction information corresponding to "mom" and the interaction information corresponding to "Xiao Zhang".

A matching degree between the input information and the second interaction information is determined based on the input information and the second interaction information. For example, a matching degree between the input information and the interaction information corresponding to "mom" is determined based on the input information and the interaction information corresponding to "mom", and similarly, a matching degree between the input information and the interaction information corresponding to "mom" is determined based on the input information and the interaction information corresponding to "Xiao Zhang". In this embodiment, a specific manner of determining matching degrees between the input information and other communication objects based on the input information and the second interaction information may be understood with reference to the three specific implementations of determining the matching degree between the input information and the first communication object in step 204, and details are not described herein.

A second communication object is determined, where a matching degree between the second communication object and the input information is highest. For example, if it is determined that a matching degree between the input information and "mom" is 3, and it is determined that a matching degree between the input information and "Xiao Zhang" is 2, "mom" is the second communication object.

Figure 4:
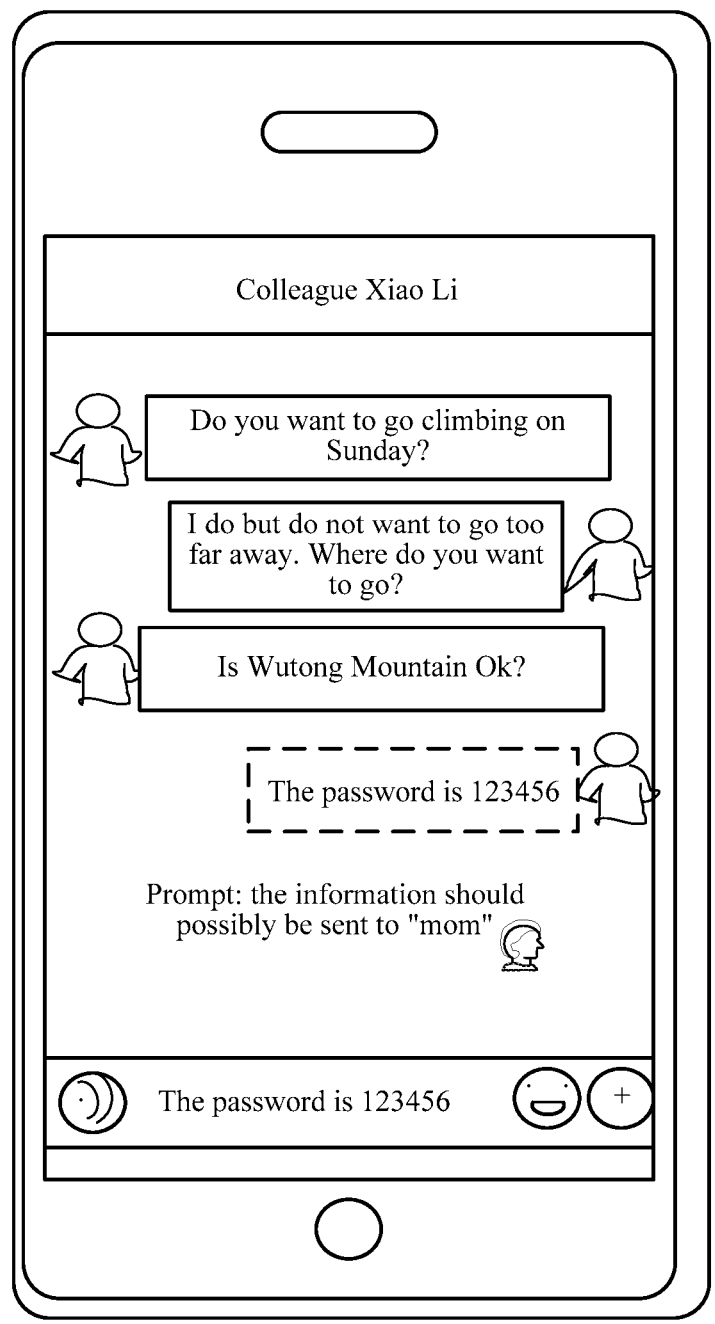
FIG. 4 is a schematic diagram of a scenario of another embodiment of an information prompt method according to an embodiment of the present invention.
Figure 5:
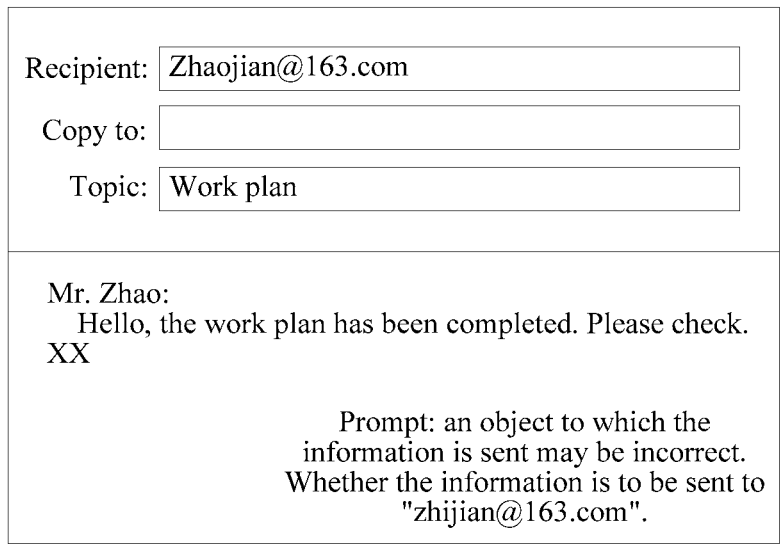
FIG. 5 is a schematic diagram of a scenario of another embodiment of an information prompt method according to an embodiment of the present invention.

Understanding is performed with reference to FIG. 4 and FIG. 5, FIG. 4 is a schematic diagram of a "WeChat" scenario, and FIG. 5 is a schematic diagram of an "email" scenario. It is prompted that the second communication object is a communication object corresponding to the input information. Optionally, an identifier of the second communication object is displayed, where the identifier includes at least one of a communication address, an address link, a name, and an icon of the second communication object.

In an application scenario corresponding to FIG. 4, the prompt information is displayed on the information input interface of the first communication object (for example, "colleague Xiao Li"), and the prompt information is used to prompt an icon and/or a name of the second communication object (for example, "mom"), where a matching degree between the input information and the second communication object corresponding to the input information is highest. In an application scenario corresponding to FIG. 5, the prompt information is displayed on the information input interface of the first communication object (for example, "zhaojian@163.com"), and the prompt information is used to prompt a communication address (for example, "zhijian@163.com") of the second communication object, where a matching degree between the input information and the second communication object corresponding to the input information is highest.

Figure 6:
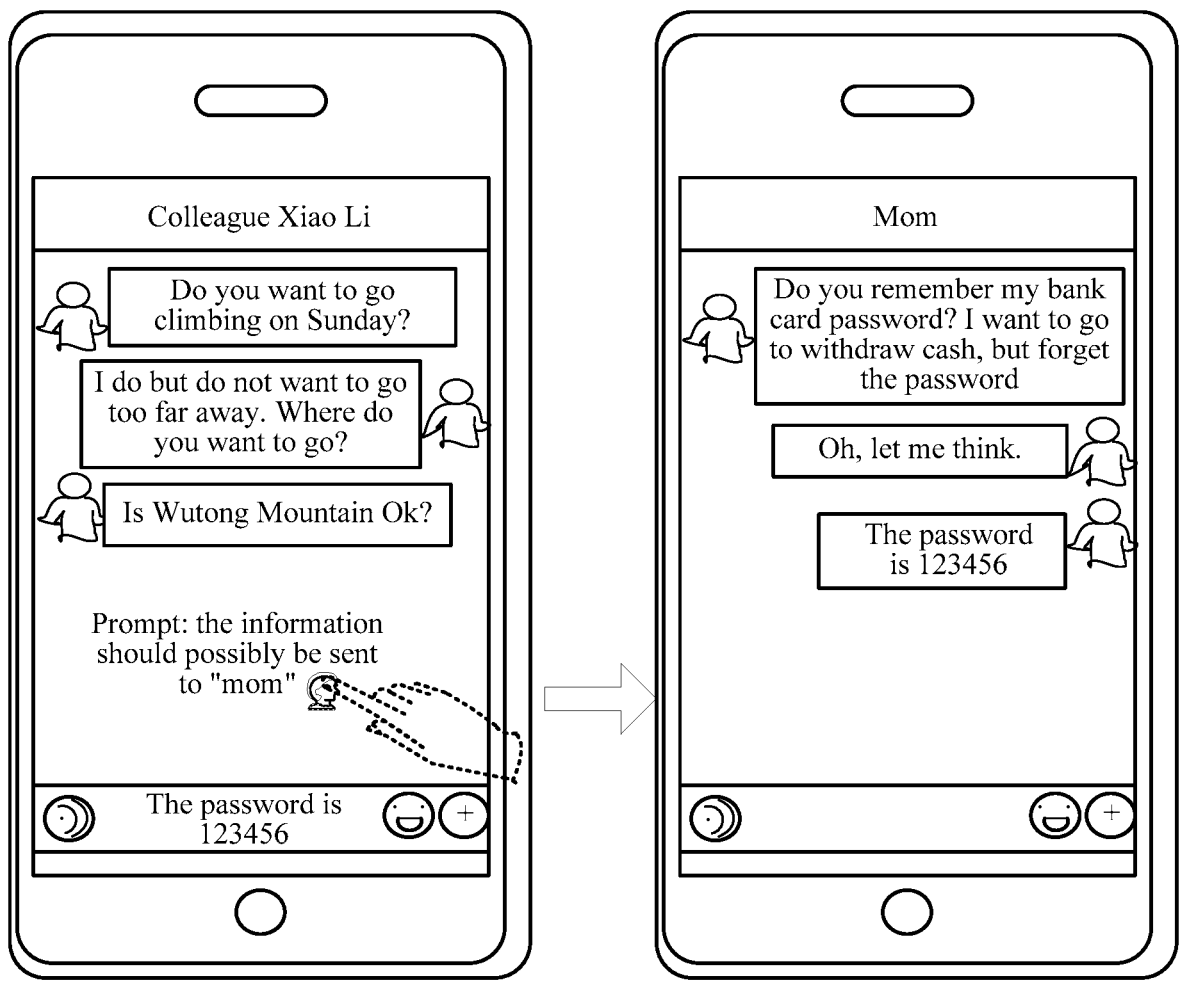
FIG. 6 is a schematic diagram of a scenario of another embodiment of an information prompt method according to an embodiment of the present invention.

Further, a first confirmation instruction is generated in response to a confirmation operation on the identifier. The information input interface is switched correspondingly to the second communication object according to the first confirmation instruction; and the input information is copied to an information input interface of the second communication object, so as to send the input information to the second communication object. Understanding is performed with reference to the schematic diagram of the scenario corresponding to FIG. 6. After a user clicks an icon of "mom", and user equipment receives a confirmation operation for an identifier, a first confirmation instruction is generated, then an information input interface is switched correspondingly to "mom" according to the first confirmation instruction, and input information (for example, that the password is 123456) is copied to an information input interface of "mom", so as to send the input information to "mom".

In this embodiment, the information input interface is switched correspondingly to the second communication object according to the first confirmation instruction, and the input information is copied to the information input interface of the second communication object, so as to send the input information to the second communication object. Even if the input information is sent to an incorrect communication object, switching to an information input interface of a communication object may be automatically performed based on prompt information, where a matching degree between the communication object and the input information is high, the user does not need to enable the information input interface of the second communication object again or to enter the input information again, to reduce operation steps of the user, be more intelligent, and save operation time of the user.

Optionally, if the matching degree is less than the first threshold, user equipment rejects receiving the second confirmation instruction entered by the user. For example, in a "WeChat" application scenario, if the matching degree is less than the first threshold, an "enter" button is not started, and the "enter" button is started only when the matching degree is greater than or equal to the first threshold, to allow receiving the second confirmation instruction entered by the user, and the user equipment sends the input information to the server according to the second confirmation instruction, so that the server sends the input information to the first communication object.

It should be noted that, in this embodiment, the first interaction information may match the input information in real time. To be specific, the first interaction information corresponding to the first communication object is obtained. For example, the input information is "password 123456". When the input information received by the user equipment is "password", matching is performed between the input information and the first interaction information. If a matching degree is less than the first threshold, prompt is performed.

Step 207: Receive, if the matching degree is greater than or equal to the first threshold, a second confirmation instruction used for sending the input information, and send the input information to a server according to the second confirmation instruction.

In another possible implementation, the first interaction information does not match the input information in real time, and instead after the input information is received by using the information input interface of the first communication object, the second confirmation instruction that is used for sending the input information and that is entered by the user is received. When receiving the second confirmation instruction, user equipment temporarily does not send the input information to the server, and instead analyzes the input information and the first interaction information according to the second confirmation instruction, obtains the matching degree between the input information and the first communication object, and rejects, if the matching degree is less than the first threshold, sending the input information to the server.

For example, in the "WeChat" application scenario, the user enters the input information "password 123456" on an information input interface corresponding to "colleague Xiao Li". In this case, the user equipment does not perform matching between the first interaction information and the input information. Then, after the user clicks the "input" button, the user equipment determines a matching degree between the first interaction information and the input information based on the received second confirmation instruction entered by the user and based on the first interaction information and the input information. If the matching degree is less than the first threshold, sending the input information "password 123456" to the server is rejected, and the "colleague Xiao Li" does not receive the input information, to avoid leakage of personal security information of the user.

It should be noted that, the foregoing embodiment may be further applied to the following scenarios, for example, 1. The target communication object is all contact information in mobile phone WeChat, and the first communication object is any one of contacts in mobile phone WeChat. For example, the contact is "colleague Xiao Li", the user chats with "mom" at first, selects "colleague Xiao Li" by mistake, and enters the input information on the information input interface of "colleague Xiao Li", and the user equipment performs matching between the input information and interaction information corresponding to "colleague Xiao Li", determines a matching degree between the input information and "colleague Xiao Li", and performs prompt if the matching degree is less than the first threshold, so as to prompt the user that the input information may be sent to an incorrect object.

2. Mobile phone WeChat of the user includes a plurality of communication objects, and the target communication object is a communication object that is not being in communication. To be specific, a condition satisfied by the target communication object is that the difference parameter between the time stamp of the last piece of interaction information and the current moment is greater than or equal to the second threshold. It may be understood that, the user is chatting with "colleague Xiao Li" and "colleague Xiao Zhang", and when intending to reply to "colleague Xiao Li" with information, the user nevertheless selects a first communication object (for example, "mom") from target objects (communication objects that are not being in communication). It may be understood that, the user selects "mom" by mistake, and enters the input information on the information input interface of "mom", and the user equipment performs matching between the input information and interaction information corresponding to "mom", determines a matching degree between the input information and "mom", and performs prompt if the matching degree is less than the first threshold, so as to prompt the user that the input information may be sent to an incorrect object.

Figure 7:
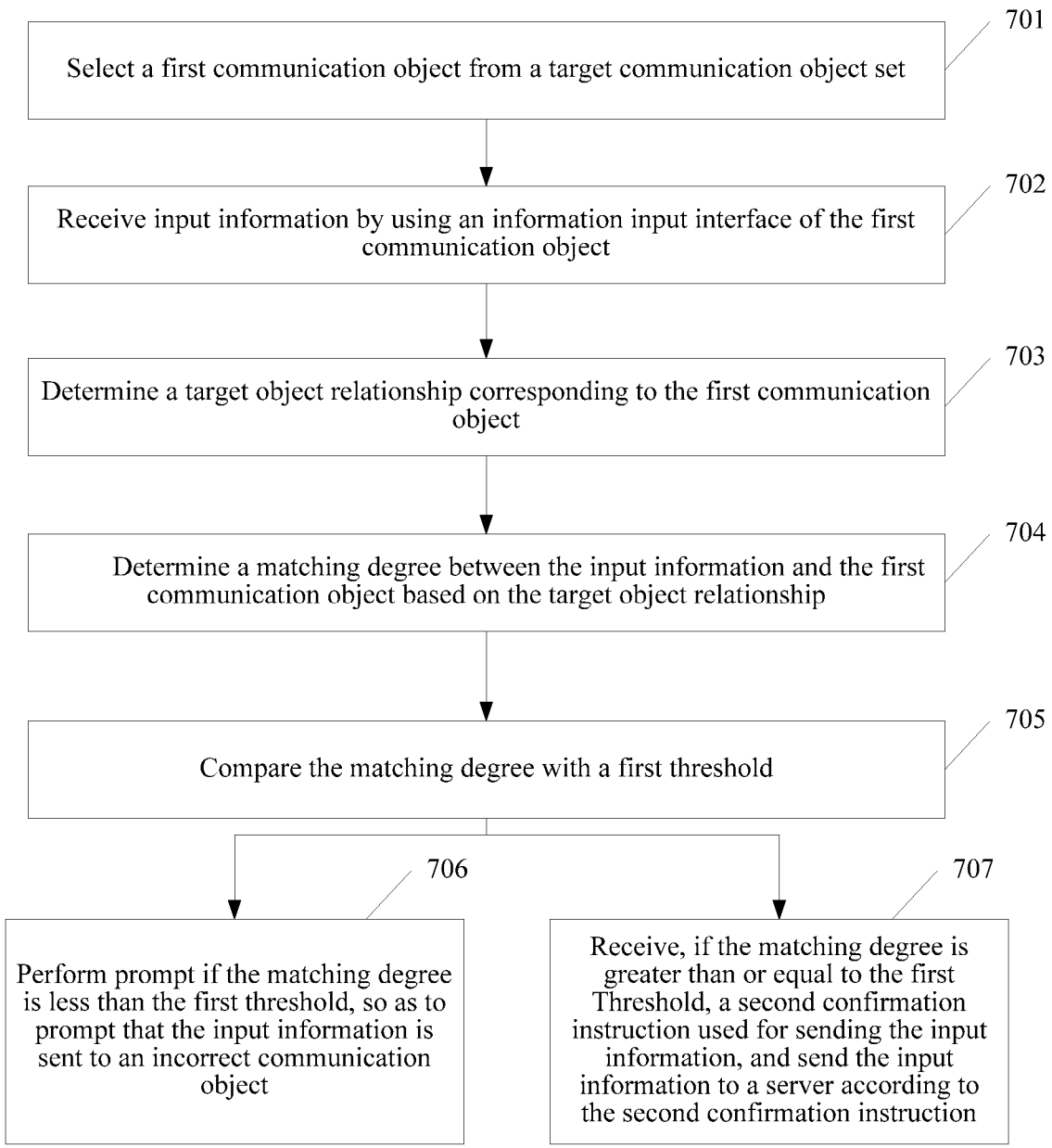
FIG. 7 is a schematic flowchart of steps of another embodiment of an information prompt method according to an embodiment of the present invention.

It should be noted that, the foregoing application scenarios are only examples of scenario description, and are not intended to limitatively describe the present invention. Referring to FIG. 7, an embodiment of the present invention provides another embodiment of an information prompt method. The method includes the following steps.

Step 701: Select a first communication object from a target communication object set.

This step is understood with reference to step 201, and details are not described herein.

Step 702: Receive input information by using an information input interface of the first communication object.

This step is understood with reference to step 203, and details are not described herein.

Step 703: Determine a target object relationship corresponding to the first communication object.

It should be noted that, before step 703, the method further includes the following steps.

1. Obtain interaction information corresponding to each communication object of target communication objects.

2. Determine an object relationship corresponding to the communication object based on the interaction information.

3. Correlatively store the object relationship and the corresponding communication object.

Step 1 to step 3 are steps of a method for determining an object relationship corresponding to each object. Provided that step 1 to step 3 are before step 703, a specific time sequence of step 1 to step 3 is not limited.

For example, interaction information of "Xiao Li" is obtained in advance, it may be determined, based on the interaction information corresponding to "Xiao Li", that an object relationship corresponding to "Xiao Li" is a "colleague relationship", and then the "colleague relationship" and "Xiao Li" are correlatively stored. It should be noted that, after the determined object relationship and the corresponding communication object are correlatively stored, step 701 may be directly performed, and step 1 to step 3 do not need to be performed.

In this embodiment, an object relationship corresponding to each communication object may be determined in advance based on interaction information of the communication object; then the object relationship and the corresponding communication object are correlatively stored; and when a first communication object is determined, a target object relationship stored correlatively with the first communication object may be obtained. A specific method for determining an object relationship corresponding to each communication object based on the interaction information may be:

First manner: the target object relationship corresponding to the first communication object may be determined based on a name of the first communication object. For example, in a "WeChat" application scenario, if it is remarked in a dialog box that a name is "colleague Xiao Li", it may be determined, based on the name, that a target object relationship corresponding to the communication object is "colleague relationship". Alternatively, if it is remarked in a dialog box that a name is "university classmate", it is determined, based on the name, that a target object relationship corresponding to the communication object is "classmate relationship".

Second manner: the analyzing the keyword in the input information by using the object model may be understood with reference to the second possible implementation and the third possible implementation in step 204 in the embodiment corresponding to FIG. 2, and details are not described herein.

Step 704: Determine a matching degree between the input information and the first communication object based on the target object relationship.

A specific implementation of determining the matching degree between the input information and the first communication object based on the target object relationship may be:

First manner: at first, after an object relationship corresponding to each communication object is determined, a corresponding first security level is set for each object relationship; and then the first security level and the corresponding object relationship are correlatively stored.

For example, understanding is performed with reference to Table 4.

TABLE 4

| Object relationship | First security level |
| --- | --- |
| Mother-child relationship | 3 |
| Father-child relationship | |
| Spouse relationship | |
| Friend relationship | 2 |
| Classmate relationship | |
| Colleague relationship | 1 |

It should be noted that, the first security level preset for each object relationship in Table 4 is only an example of description, and is not intended to limitatively describe the present invention.

Then, the input information is evaluated by using a security evaluation model, and it is learned that a security level of the input information is a second security level, where the security evaluation model is obtained by performing learning and training in advance on a keyword set that is used to indicate user information and a security level that corresponds to a keyword, where keywords included in the keyword set that is used to indicate the user information include but are not limited to: password, Alipay, identity card number, account, bank card, and the like.

For example, the input information includes such a keyword as "password", the input information is evaluated by using the security evaluation model, and it is learned that the second security level of the input information is "3".

Matching is performed based on the first security level corresponding to the target object relationship and the second security level, and the matching degree between the input information and the first communication object is obtained.

For example, if the target object relationship is a "mother-child relationship", the first security level corresponding to the "mother-child relationship" is a first preset value (for example, "3") based on the example in Table 4, and the second security level of the input information is also the first preset value (for example, "3"). If the first security level matches the second security level, an obtained matching degree between the input information and the first communication object is "1". It should be noted that, in a simple embodiment, if the first security level matches the second security level, an obtained matching degree is "1"; or if the first security level does not match the second security level, an obtained matching degree is "0". Certainly, the foregoing is described by using only a simple example, and is not intended to limitatively describe the present invention. Understanding is performed with reference to the second implementation and the third implementation step 204 in the embodiment corresponding to FIG. 2, and details are not described herein.

Step 705: Compare the matching degree and a first threshold. If the matching degree is less than the first threshold, step 706 is performed. If the matching degree is greater than or equal to the first threshold, step 707 is performed.

Understanding is performed with reference to step 205 in the embodiment corresponding to FIG. 2, and details are not described herein.

Step 706: Perform prompt if the matching degree is less than the first threshold.

Understanding is performed with reference to step 206 in the embodiment corresponding to FIG. 2, and details are not described herein.

Step 707: Receive, if the matching degree is greater than or equal to the first threshold, a second confirmation instruction used for sending the input information, and send the input information to a server according to the second confirmation instruction.

Understanding is performed with reference to step 207 in the embodiment corresponding to FIG. 2, and details are not described herein.

In the embodiments of the present invention, whether the input information is sent to an appropriate object is determined by determining the target object relationship corresponding to the first communication object, and if the input information is not suitable for being sent to the first communication object corresponding to the target object relationship, prompt is performed, so as to prompt the user that the input information may be sent to an incorrect communication object, thereby greatly reducing a probability of sending the input information to an incorrect communication object.

Figure 8:
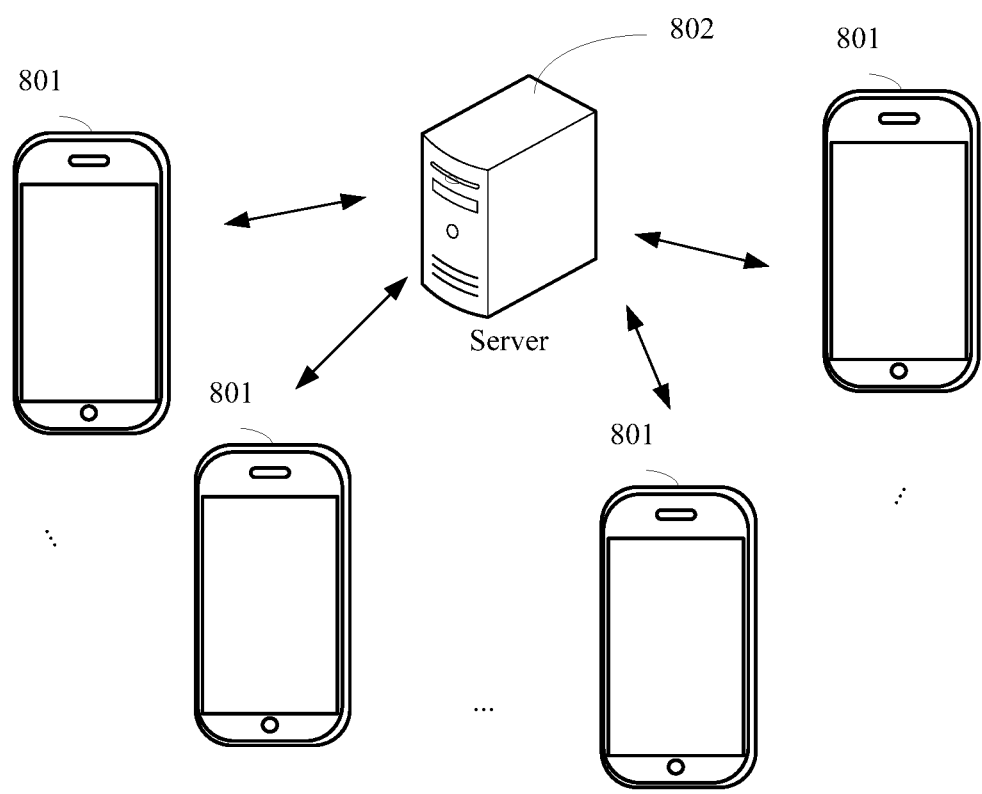
FIG. 8 is a schematic diagram of an architecture of a communication system according to an embodiment of the present invention.
Figure 9:
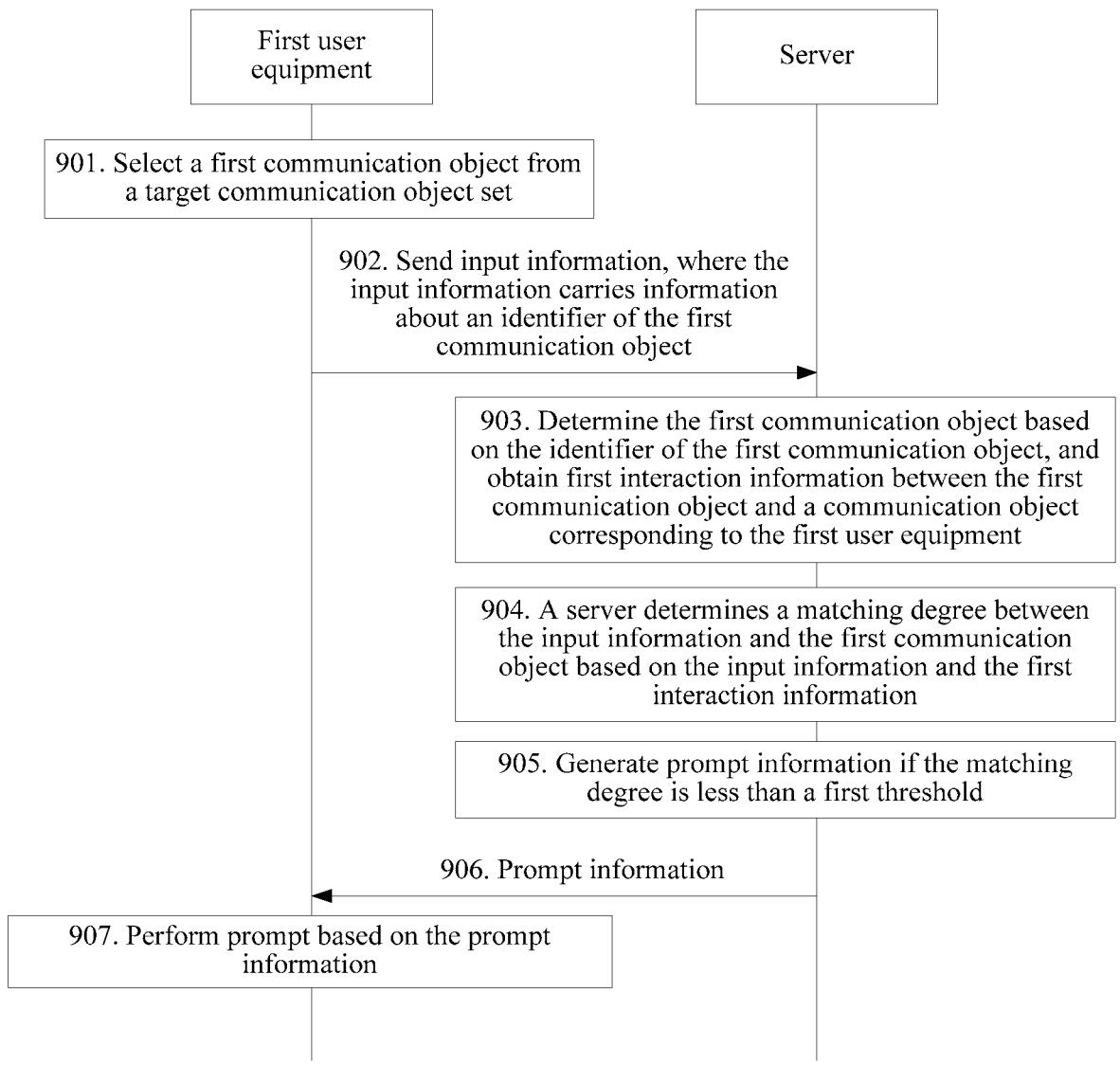
FIG. 9 is a schematic flowchart of steps of another embodiment of an information prompt method according to an embodiment of the present invention.

An embodiment of the present invention further provides an information prompt method, and the method may be further applied to a communications system. FIG. 8 is a schematic diagram of an architecture of the communications system. The communications system includes user equipment 801 and a server 802. This embodiment is different from the embodiments corresponding to FIG. 2 and FIG. 7 in that, in this embodiment, a step of determining a matching degree between input information and a first communication object may be performed by the server, so as to reduce calculation steps of the user equipment, and reduce a calculation pressure on the user equipment. Referring to FIG. 9, an embodiment of the present invention provides another embodiment of an information prompt method. The method includes the following steps.

Step 901: First user equipment selects a first communication object from a target communication object set.

Understanding is performed with reference to step 201 in the embodiment corresponding to FIG. 2, and details are not described herein.

Step 902: The first user equipment receives input information by using an information input interface of the first communication object, and sends the input information to a server, where the input information carries information about an identifier of the first communication object.

Understanding is performed with reference to step 203 in the embodiment corresponding to FIG. 2, and details are not described herein.

Step 903: The server receives the input information, determines the first communication object based on the identifier of the first communication object, and obtains first interaction information between the first communication object and a communication object corresponding to the first user equipment.

Understanding is performed with reference to step 202 in the embodiment corresponding to FIG. 2, and details are not described herein.

Step 904: The server determines a matching degree between the input information and the first communication object based on the input information and the first interaction information.

Understanding is performed with reference to step 204 in the embodiment corresponding to FIG. 2, and details are not described herein.

Step 905: The server generates prompt information if the matching degree is less than a first threshold.

The prompt information may be an identifier of a second communication object.

Understanding is performed with reference to step 206 in the embodiment corresponding to FIG. 2, and details are not described herein.

Step 906: The server sends the prompt information to the first user equipment.

Step 907: The first user equipment receives the prompt information, and performs prompt based on the prompt information.

Understanding is performed with reference to step 206 in the embodiment corresponding to FIG. 2, and details are not described herein.

Optionally, if the matching degree is greater than or equal to the first threshold, the server sends the input information to second user equipment corresponding to the first communication object.

Figure 10:
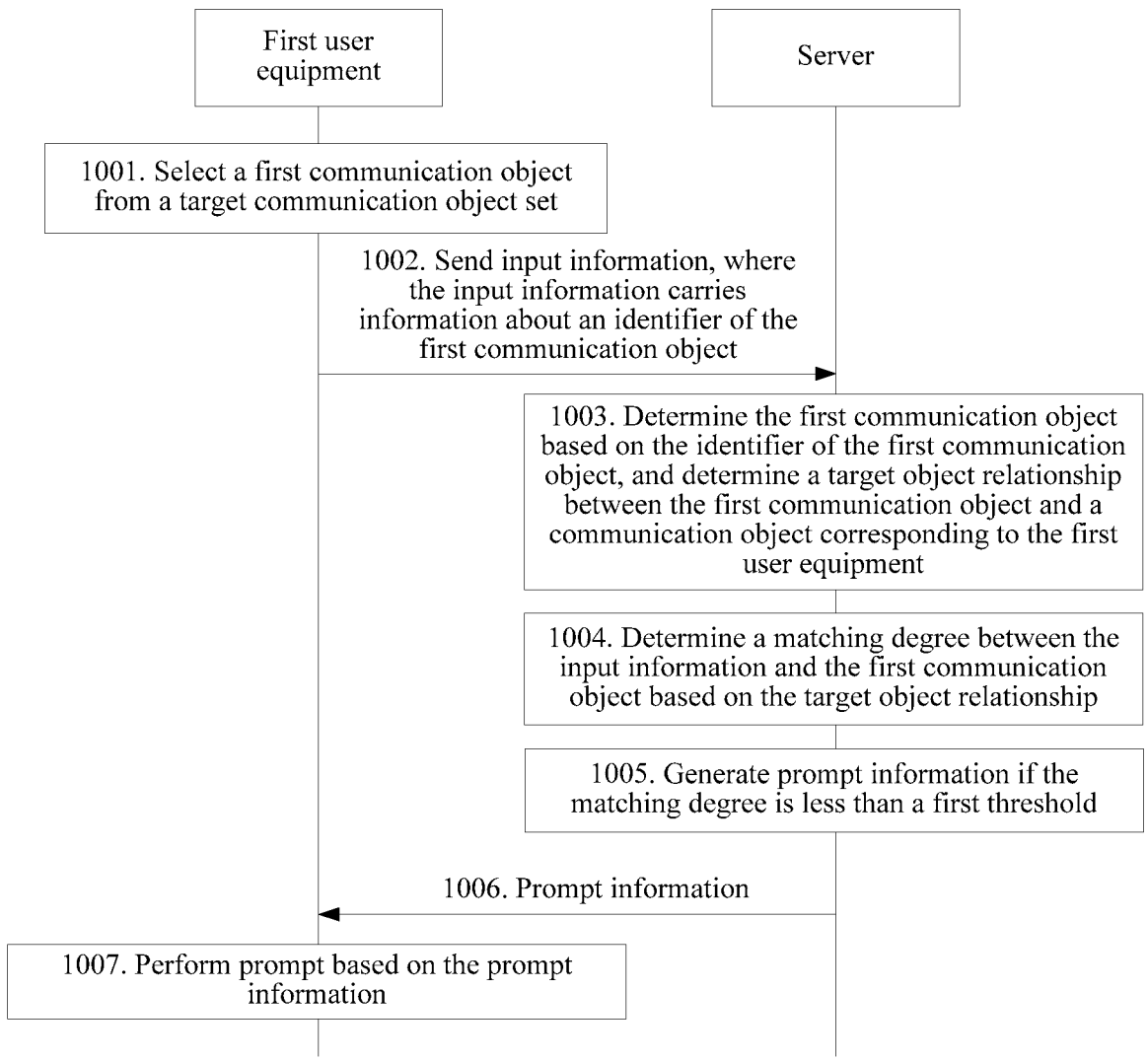
FIG. 10 is a schematic structural diagram of an embodiment of an information prompt apparatus according to an embodiment of the present invention.

Based on the architecture corresponding to FIG. 8, referring to FIG. 10, an embodiment of the present invention provides another embodiment of an information prompt method.

Step 1001: First user equipment selects a first communication object from a target communication object set.

Understanding is performed with reference to step 701 in the embodiment corresponding to FIG. 7, and details are not described herein.

Step 1002: The first user equipment receives input information by using an information input interface of the first communication object, and sends the input information to a server, where the input information carries information about an identifier of the first communication object.

Understanding is performed with reference to step 702 in the embodiment corresponding to FIG. 7, and details are not described herein.

Step 1003: The server receives the input information, determines the first communication object based on the identifier of the first communication object, and determines a target object relationship between the first communication object and a communication object corresponding to the first user equipment.

Understanding is performed with reference to step 703 in the embodiment corresponding to FIG. 7, and details are not described herein.

Step 1004: The server determines a matching degree between the input information and the first communication object based on the target object relationship.

Understanding is performed with reference to step 704 in the embodiment corresponding to FIG. 7, and details are not described herein.

Step 1005: The server generates prompt information if the matching degree is less than a first threshold.

Understanding is performed with reference to step 706 in the embodiment corresponding to FIG. 7, and details are not described herein.

Step 1006: The server sends the prompt information to the first user equipment.

Step 1007: The first user equipment receives the prompt information, and performs prompt based on the prompt information, so as to prompt a user that the input information may be sent to an incorrect communication object.

Optionally, if the matching degree is greater than or equal to the first threshold, the server sends the input information to second user equipment corresponding to the first communication object.

In this embodiment, the server determines the target object relationship between the first communication object and the communication object corresponding to the first user equipment, and then determines the matching degree between the input information and the first communication object based on the target object relationship and the input information; and if the matching degree is less than the first threshold, the server generates the prompt information, and then sends the prompt information to the corresponding first user equipment, so as to prompt the user that the input information may be sent to an incorrect communication object. In this embodiment, a step of determining the matching degree between the input information and the first communication object may be performed by the server, so as to reduce calculation steps of the user equipment, and reduce a calculation pressure on the user equipment.

Figure 11:
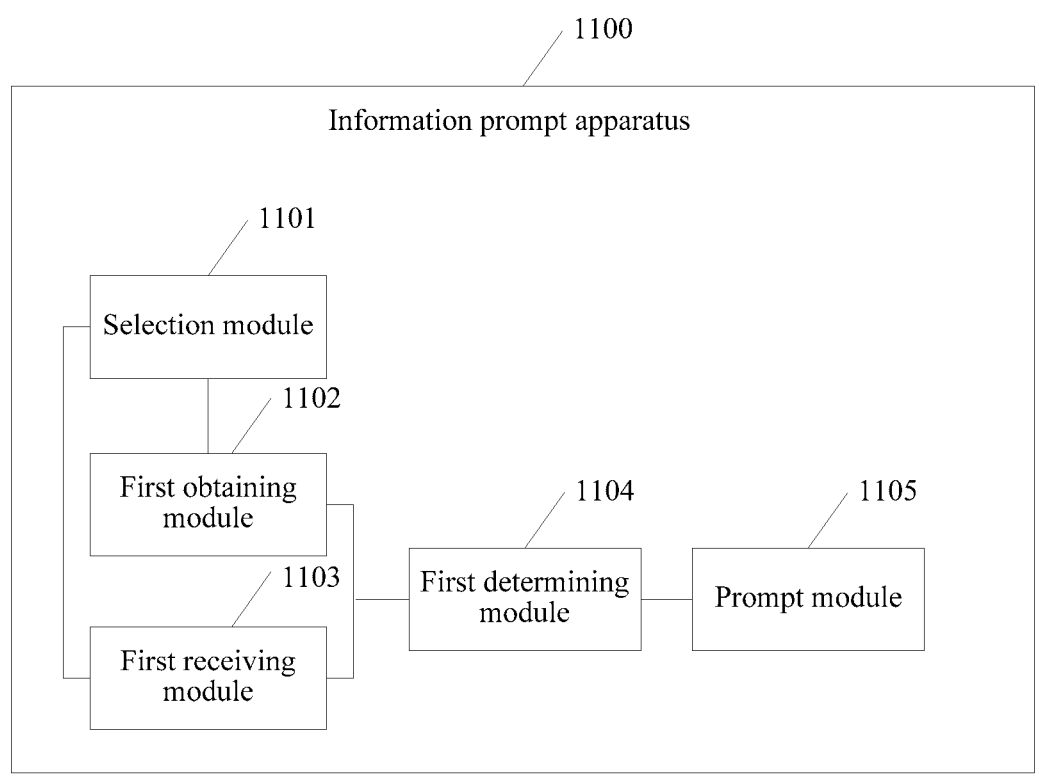
FIG. 11 is a schematic structural diagram of another embodiment of an information prompt apparatus according to an embodiment of the present invention.

An information prompt method is described above, and an apparatus to which the method is applied is described below. Referring to FIG. 11, an embodiment of an information prompt apparatus 1100 provided in an embodiment of the present invention includes:

a selection module 1101, configured to select a first communication object from a target communication object set;

a first obtaining module 1102, configured to obtain first interaction information corresponding to the first communication object determined by the selection module 1101;

a first receiving module 1103, configured to receive input information by using an information input interface of the first communication object determined by the selection module 1101;

a first determining module 1104, configured to determine a matching degree between the input information and the first communication object based on the input information received by the first receiving module 1103 and the first interaction information obtained by the first obtaining module 1102; and a prompt module 1105, configured to perform prompt if the matching degree determined by the first determining module 1104 is less than a first threshold.

Optionally, the first determining module 1104 is further specifically configured to:

perform contextual semantic analysis on the input information and the first interaction information, and obtain a correlation between the input information and a context of the first interaction information; and determine the matching degree between the input information and the first communication object based on the correlation.

Optionally, the first determining module 1104 is further specifically configured to:

extract a keyword that is used to represent an object relationship and that is in the first interaction information;

analyze the keyword by using an object model, and determine a target object relationship corresponding to the first communication object, where the object model is obtained by leaning and training a keyword set for describing the object relationship; and determine the matching degree between the input information and the first communication object based on the target object relationship.

Optionally, the first determining module 1104 is further specifically configured to:

extract a keyword that is used to represent an object relationship and that is in the first interaction information, where the object relationship is used to indicate an interpersonal relationship between a user and an object;

perform matching between the keyword and a plurality of preset object relationship templates, and determine a target object relationship corresponding to the first communication object, where each of the plurality of object relationship templates includes a keyword set used to represent an object relationship; and determine the matching degree between the input information and the first communication object based on the target object relationship.

Figure 12:
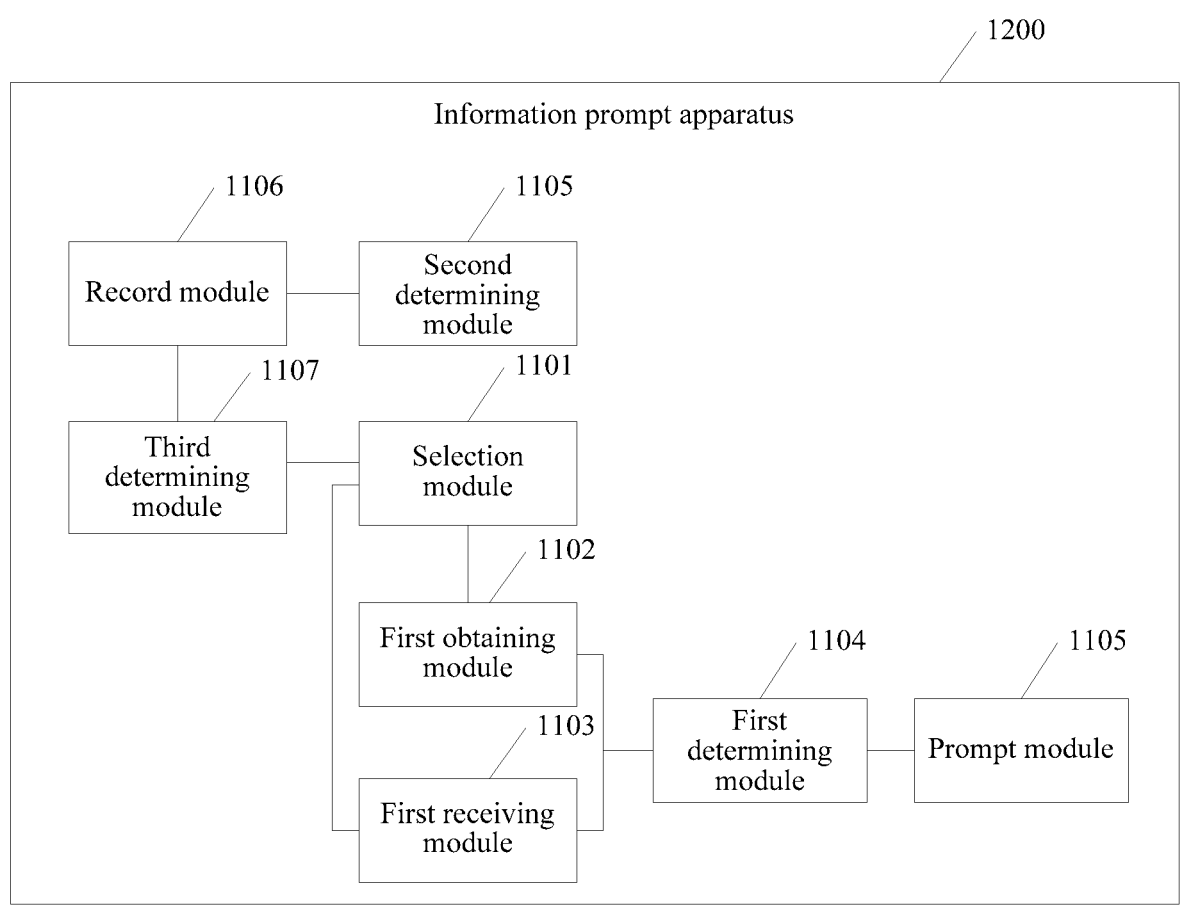
FIG. 12 is a schematic structural diagram of another embodiment of an information prompt apparatus according to an embodiment of the present invention.

Referring to FIG. 12, based on the embodiment corresponding to FIG. 11, an embodiment of the present invention further provides an embodiment of an information prompt apparatus 1200.

The apparatus further includes a second determining module 1105, a record module 1106, and a third determining module 1107.

The second determining module 1105 is configured to determine a plurality of communication objects.

The record module 1106 is configured to record a time stamp of a last piece of interaction information corresponding to each of the plurality of communication objects determined by the second determining module 1105.

The third determining module 1107 is configured to determine, when a difference parameter between the time stamp recorded by the record module 1106 and a current moment is less than a second threshold, that a communication object corresponding to the time stamp is a target communication object.

Figure 13:
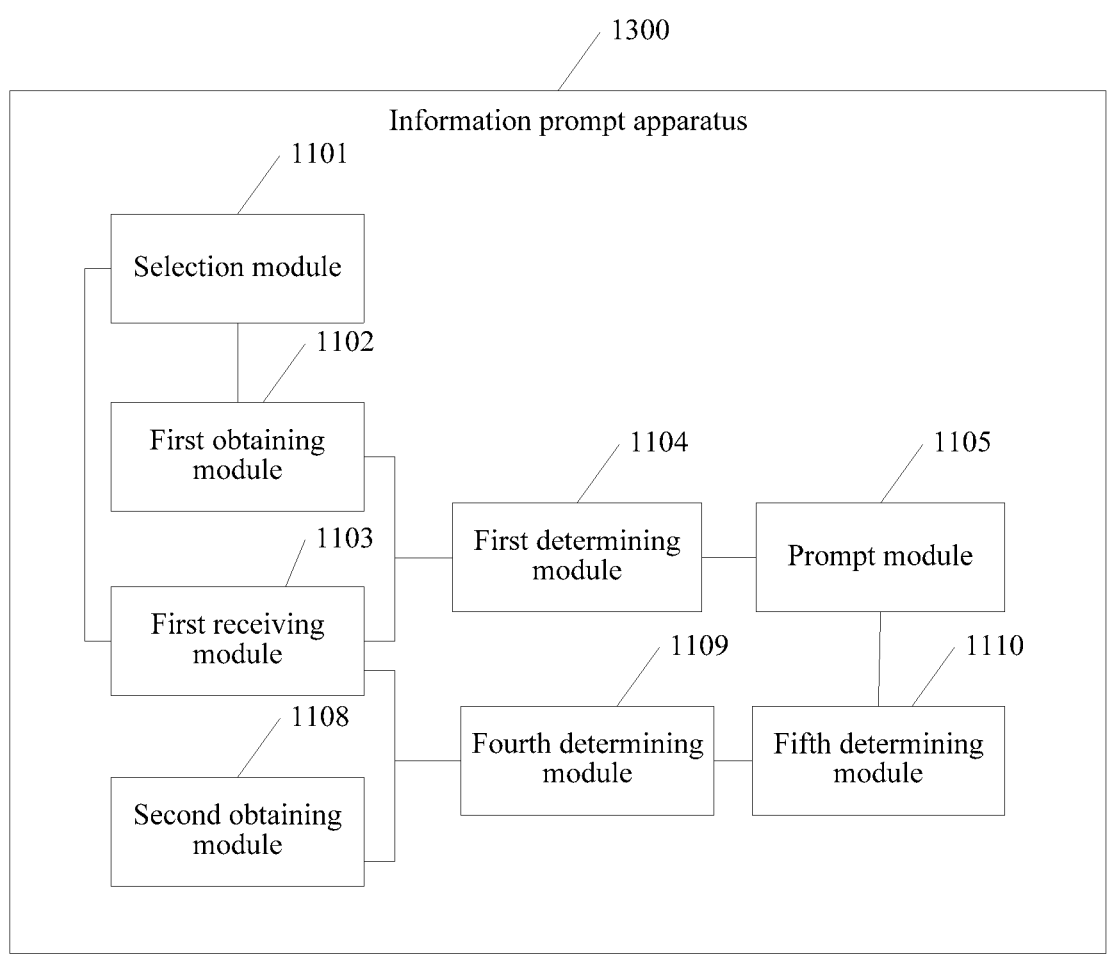
FIG. 13 is a schematic structural diagram of another embodiment of an information prompt apparatus according to an embodiment of the present invention.

Referring to FIG. 13, based on the embodiment corresponding to FIG. 11, an embodiment of the present invention further provides an embodiment of an information prompt apparatus 1300.

The apparatus further includes a second obtaining module 1108, a fourth determining module 1109, and a fifth determining module 1110.

The second obtaining module 1108 is configured to obtain second interaction information corresponding to other communication objects than the first communication object in the target communication object set.

The fourth determining module 1109 is configured to determine matching degrees between the input information and the other communication objects based on the input information received by the first receiving module 1103 and the second interaction information obtained by the second obtaining module 1108.

The fifth determining module 1110 is configured to determine a second communication object in the other communication objects, where a matching degree, determined by the fourth determining module 1109, between the second communication object and the input information is highest.

The prompt module 1105 is further configured to prompt that the second communication object determined by the fifth determining module 1110 is a communication object corresponding to the input information.

Optionally, the prompt module 1105 is further configured to display an identifier of the second communication object, where the identifier includes at least one of a communication address, an address link, a name, and an icon of the second communication object.

Figure 14:
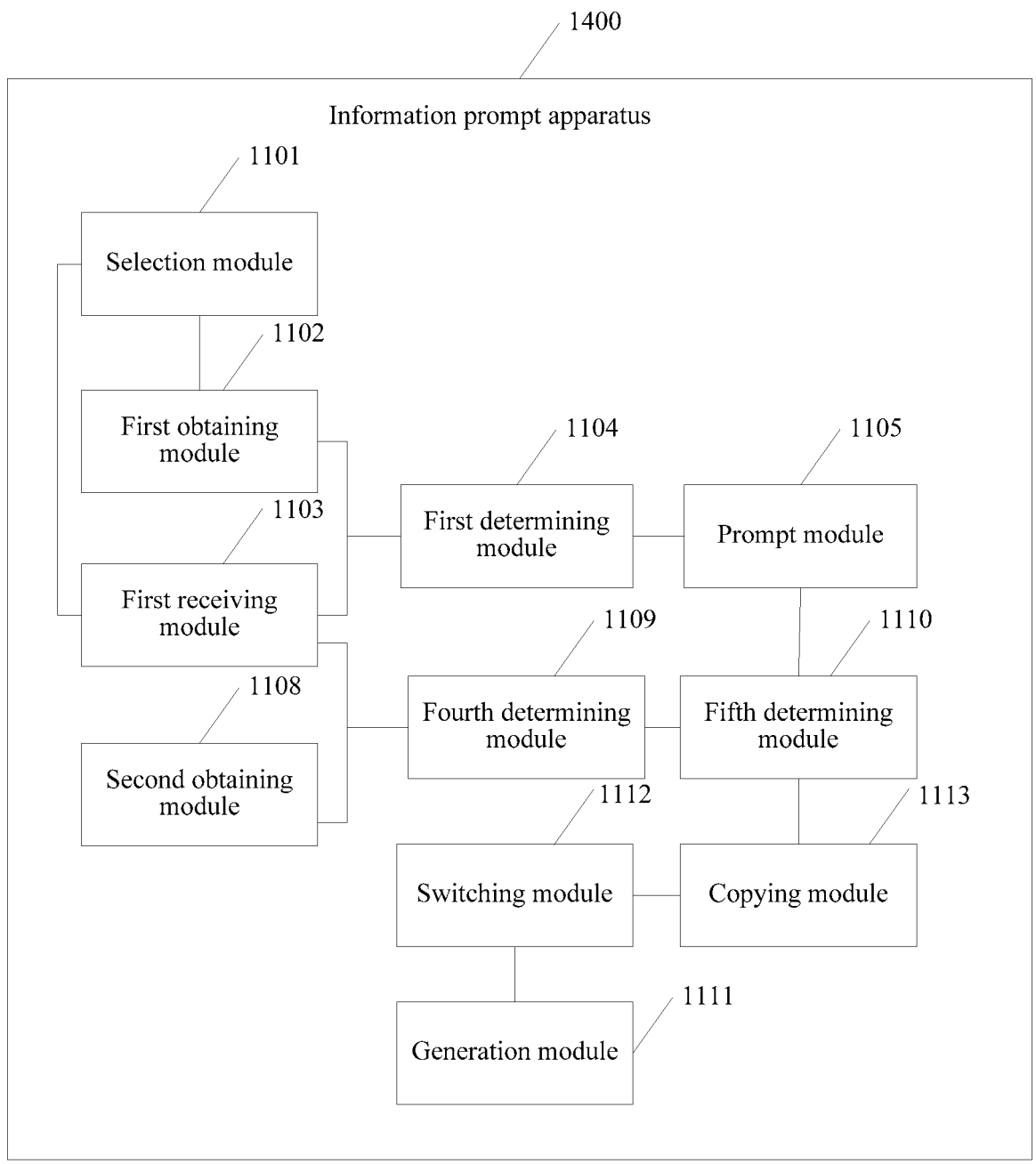
FIG. 14 is a schematic structural diagram of another embodiment of an information prompt apparatus according to an embodiment of the present invention.

Referring to FIG. 14, based on the embodiment corresponding to FIG. 13, another embodiment of the present invention further provides an embodiment of an information prompt apparatus 1400.

The apparatus further includes a generation module 1111, a switching module 1112, and a copying module 1113.

The generation module 1111 is configured to generate a first confirmation instruction in response to a confirmation operation on the identifier.

The switching module 1112 is configured to switch, according to the first confirmation instruction generated by the generation module 1111, the information input interface correspondingly to the second communication object.

The copying module 1113 is configured to copy the input information received by the receiving module to the information input interface of the second communication object switched by the switching module 1112.

Figure 15:
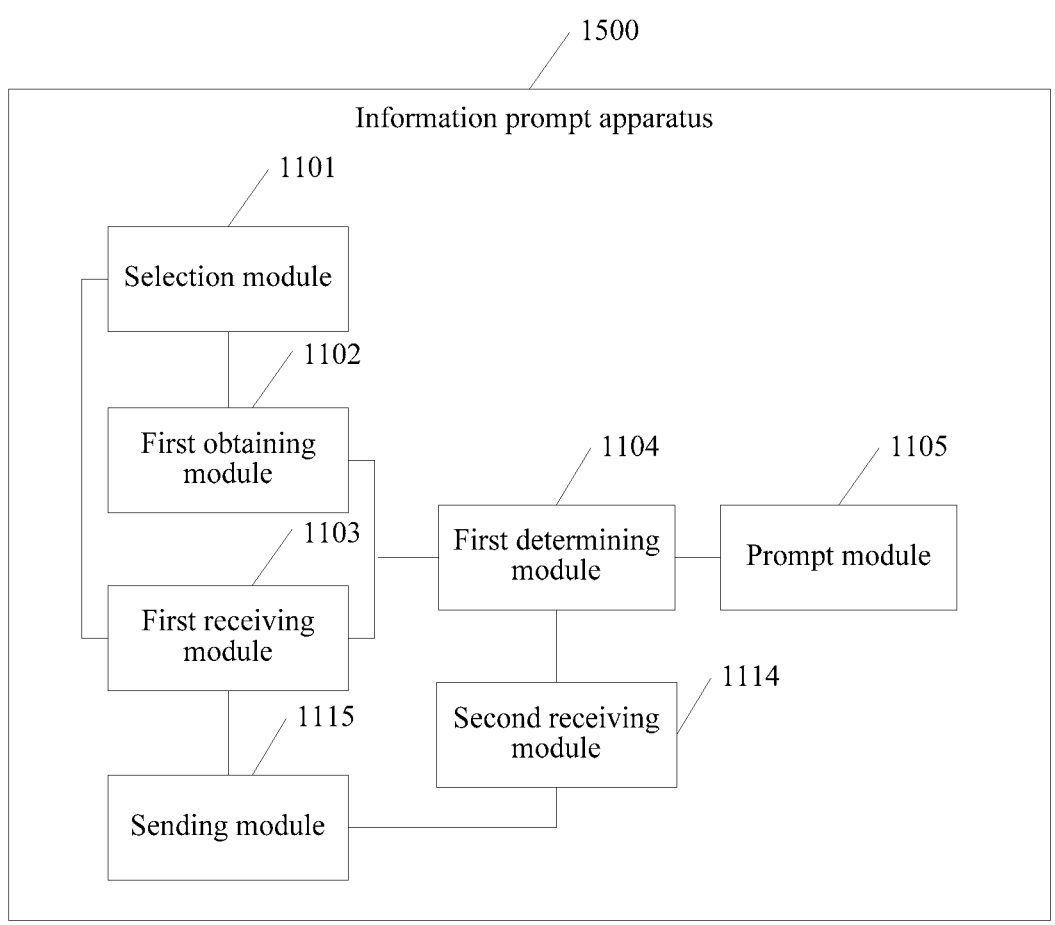
FIG. 15 is a schematic structural diagram of another embodiment of an information prompt apparatus according to an embodiment of the present invention.

Referring to FIG. 15, based on the embodiment corresponding to FIG. 11, another embodiment of the present invention further provides an embodiment of an information prompt apparatus 1500.

The apparatus further includes a second receiving module 1114 and a sending module 1115.

The second receiving module 1114 is configured to receive, when the matching degree determined by the first determining module 1104 is greater than or equal to the first threshold, a second confirmation instruction for sending the input information.

The sending module 1115 is configured to send the input information received by the first receiving module 1103 to a server according to the second confirmation instruction received by the second receiving module 1114.

Figure 16:
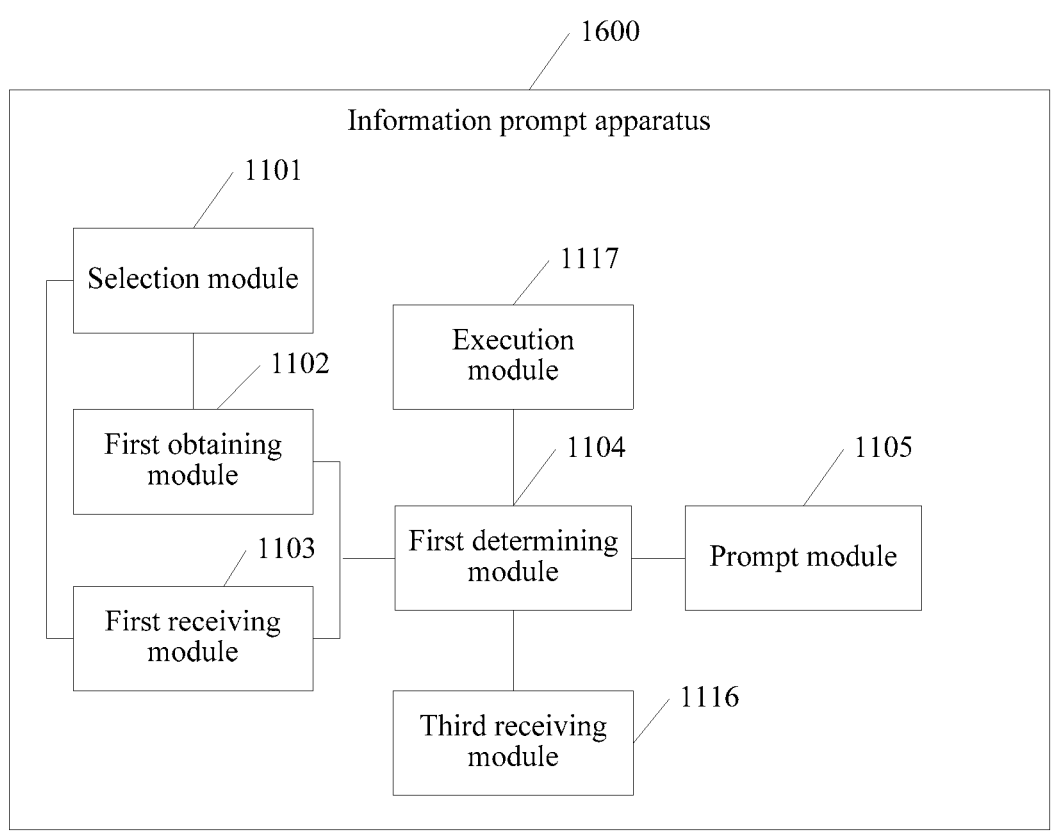
FIG. 16 is a schematic structural diagram of another embodiment of an information prompt apparatus according to an embodiment of the present invention.

Referring to FIG. 16, based on the embodiment corresponding to FIG. 11, another embodiment of the present invention further provides an embodiment of an information prompt apparatus 1600.

The apparatus further includes a third receiving module 1116 and an execution module 1117.

The third receiving module 1116 is configured to receive a second confirmation instruction for sending the input information.

The first determining module 1104 is further configured to analyze, according to the second confirmation instruction received by the third receiving module 1116, the input information received by the first receiving module 1103 and the first interaction information obtained by the first obtaining module 1102, and determine the matching degree between the input information and the first communication object.

The execution module 1117 is configured to reject, when the matching degree determined by the first determining module 1104 is less than the first threshold, sending the input information to a server.

Further, the apparatus in FIG. 12 to FIG. 16 is presented in a form of a functional module. The "module" herein may be an application-specific integrated circuit (application-specific integrated circuit, ASIC), a circuit, a processor for executing one or more software or firmware programs, a memory, an integrated logic circuit, and/or another device that may provide the foregoing function. In a simple embodiment, a form shown in FIG. 17 may be used for the apparatus in FIG. 12 to FIG. 16.

An embodiment of the present invention relates to an information prompt apparatus, and the apparatus may include a mobile phone, a tablet computer, a personal digital assistant (Personal Digital Assistant, PDA), or the like.

Figure 17:
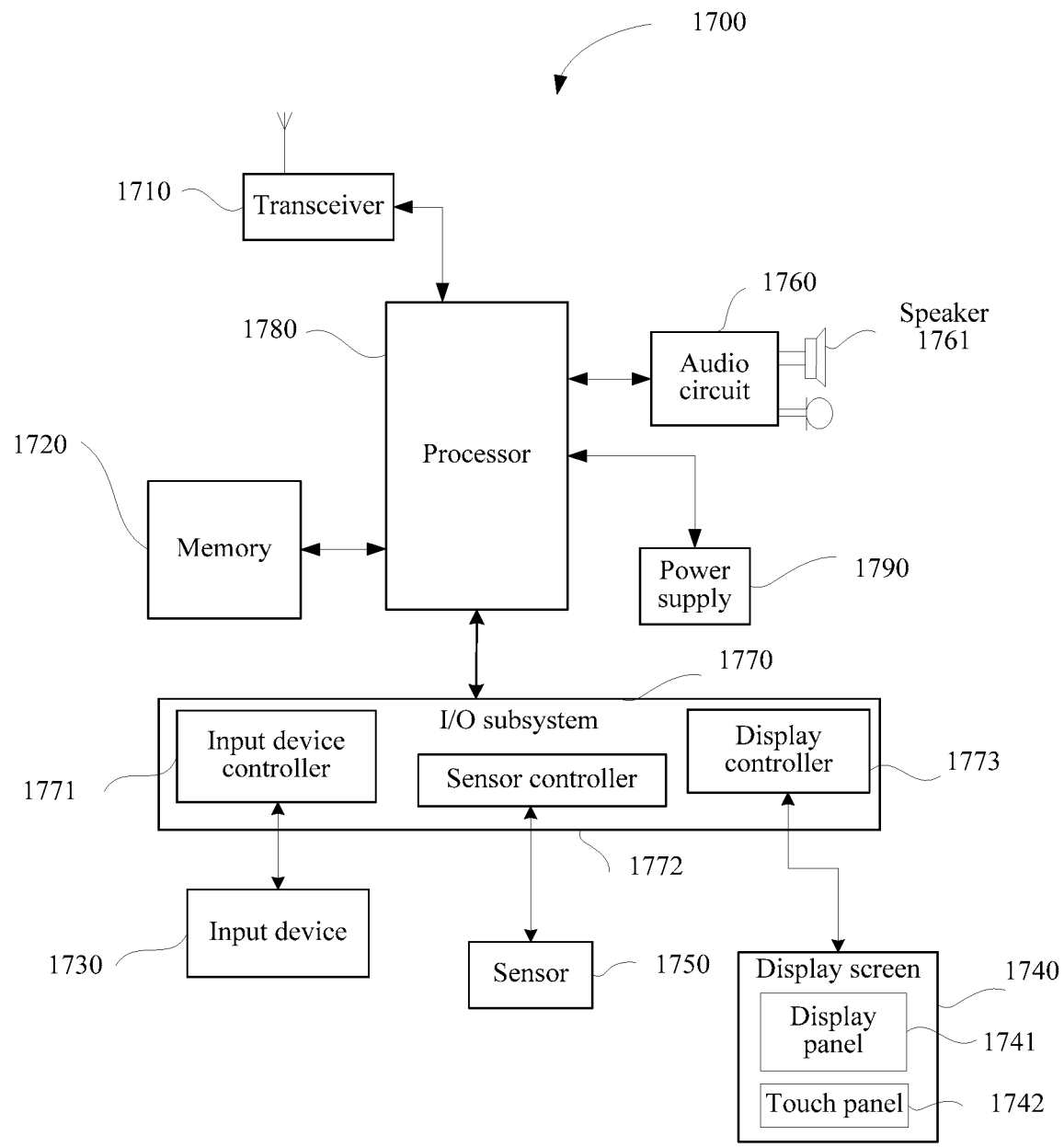
FIG. 17 is a schematic structural diagram of another embodiment of an information prompt apparatus according to an embodiment of the present invention.

Using an example in which the apparatus is a mobile phone, FIG. 17 is a block diagram of a partial structure of a mobile phone 1700 related to an embodiment of the present invention. Referring to FIG. 17, the mobile phone 1700 includes components such as a transceiver 1710, a memory 1720, an input device 1730, a display screen 1740, a sensor 1750, an audio circuit 1760, an I/O subsystem 1770, a processor 1780, and a power supply 1790. A person skilled in the art may understand that the structure of the mobile phone shown in FIG. 17 does not constitute a limitation to the mobile phone, and the mobile phone may include more components or fewer components than those shown in the figure, or some components may be combined, or some components may be separated, or a different component deployment may be used. Persons skilled in the art may understand that the display screen 1740 belongs to a user interface (UI, User Interface), and the mobile phone 1700 may include more or fewer user interfaces than those shown in the figure.

The following specifically describes the components of the mobile phone 1700 with reference to FIG. 17.

The transceiver 1710 may be configured to receive and send signals during an information receiving and sending process or a call process. Specifically, the transceiver receives downlink information from a base station, then delivers the downlink information to the processor 1780 for processing, and sends related uplink data to the base station. The transceiver 1710 usually includes, but is not limited to, an antenna, at least one amplifier, a coupler, an LNA (Low Noise Amplifier, low noise amplifier), and a duplexer.

The memory 1720 may be configured to store a software program and a module, and the processor 1780 runs the software program and the module that are stored in the memory 1720, so as to perform various function applications of the mobile phone 1700 and data processing. The memory 1720 may mainly include a program storage area and a data storage area. The program storage area may store an operating system, an application program required by at least one function (such as a sound playback function and an image display function), and the like. The data storage area may store data (such as audio data and an address book) created based on use of the mobile phone 1700, and the like. In addition, the memory 1720 may include a high speed random access memory, and may also include a non-volatile memory such as at least one magnetic disk storage device, a flash memory, or another volatile solid-state storage device.

The input device 1730 may be configured to receive input digit or character information, and generate a key signal input related to user setting and function control of the mobile phone 1700. Specifically, the input device 1730 may include but is not limited to one or more of a physical keyboard, a function key (for example, a volume control key or a power on/off key), a trackball, a mouse, a joystick, or an optical mouse (the optical mouse is a touch-sensitive surface that does not display a visible output, or an extension of a touch-sensitive surface formed by a touchscreen). The input device 1730 is connected to an input device controller 1771 of the I/O subsystem 1770, and performs signal exchange with the processor 1780 under control of the input device controller 1771.

The display screen 1740 may be configured to display information entered by a user or information provided to a user, and various menus of the mobile phone 1700, and may further receive a user input. Specifically, the display screen

1740 may include a display panel 1741 and a touch panel 1742. The display panel 1741 may be configured in a form such as an LCD (Liquid Crystal Display, liquid crystal display) an OLED (Organic Light-Emitting Diode, organic light-emitting diode). The touch panel 1742 is also referred to as a touchscreen, a touch-sensitive screen, or the like, and may collect a touch operation or non-touch operation of the user on or near the touch panel (such as an operation of a user on the touch panel 1742 or near the touch panel 1742 by using any suitable object or accessory such as a finger or a stylus, or including a motion sensing operation including operation types such as an isolated control operation and a multipoint control operation), and drives a corresponding connection apparatus based on a preset program. Optionally, the touch panel 1742 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor and sends the information to the processor 1780, and can receive a command sent by the processor 1780 and execute the command. In addition, the touch panel 1742 may be implemented by using a plurality of types such as a resistive type, a capacitive type, an infrared type, and a surface acoustic wave type, or the touch panel 1742 may be implemented by using any technology of future development. Further, the touch panel 1742 may cover the display panel 1741. The user may perform, based on content (the displayed content includes but is not limited to a soft keyboard, a virtual mouse, a virtual key, an icon, and the like) displayed on the display panel 1741, an operation on or near the touch panel 1742 covering the display panel 1741. After detecting the operation on or near the touch panel 1742, the touch panel 1742 transfers the operation to the processor 1780 by using the I/O subsystem 1770, to determine the user input. Subsequently, the processor 1780 provides a corresponding visual output on the display panel 1741 by using the I/O subsystem 1770 based on the user input. Although, in FIG. 17, the touch panel 1742 and the display panel 1741 are used as two separate parts to implement input and output functions of the mobile phone 1700, in some embodiments, the touch panel 1742 and the display panel 1741 may be integrated to implement the input and output functions of the mobile phone 1700.

The mobile phone 1700 may further include at least one sensor 1750 such as an optical sensor, a motion sensor, and other sensors. Specifically, the optical sensor may include an ambient light sensor and a proximity sensor. The ambient light sensor may adjust luminance of the display panel 1741 based on brightness of the ambient light. The proximity sensor may switch off the display panel 1741 and/or backlight when the mobile phone 1700 is moved to an ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. For other sensors such as a gyroscope, a barometer, a hygrometer, a thermometer, and an infrared sensor, which may be configured in the mobile phone 1700, details are not described herein.

The audio circuit 1760, a loudspeaker 1761, and a microphone 1762 may provide audio interfaces between the user and the mobile phone 1700. The audio circuit 1760 may convert received audio data into a signal and transmit the signal to the speaker 1761. The speaker 1761 converts the signal into a sound signal for output. On the other hand, the microphone 1762 converts a collected sound signal into a signal. The audio circuit 1760 receives the signal and converts the signal into audio data, and outputs the audio data to the transceiver 1710 to send the audio data to, for example, another mobile phone, or outputs the audio data to the memory 1720 for further processing.

The I/O subsystem 1770 is configured to control an external input/output device, and may include the input device controller 1771, a sensor controller 1772, and a display controller 1773. Optionally, one or more input control device controllers 1771 receive a signal from the input device 1730 and/or send a signal to the input device 1730, and the input control device controller 1771 may be connected to any one or more of the foregoing devices. The display controller 1773 in the I/O subsystem 1770 receives a signal from the display screen 1740 and/or sends a signal to the display screen 1740. After the display screen 1740 detects the user input, the display controller 1773 converts the detected user input into interaction with a user interface object displayed on the display screen 1740. To be specific, man-machine interaction is implemented. The sensor controller 1772 may receive a signal from one or more sensors 1750 and/or may send a signal to the one or more sensors 1750.

The processor 1780 is the control center of the mobile phone 1700, and is connected to various parts of the entire mobile phone by using various interfaces and lines. By running or executing the software program and/or module stored in the memory 1720, and invoking data stored in the memory 1720, the processor performs various functions and data processing of the mobile phone 1700, thereby performing overall monitoring on the mobile phone. Optionally, the processor 1780 may include one or more processing units. The processor 1780 may integrate an application processor and a modem processor. The application processor mainly processes an operating system, a user interface, an application program, and the like. The modem processor mainly processes wireless communication. It may be understood that the foregoing modem processor may alternatively be not integrated into the processor 1780.

The mobile phone 1700 further includes the power supply 1790 (such as a battery) for supplying power to the components. The power supply may logically connect to the processor 1780 by using a power supply management system, thereby implementing functions, such as charging, discharging, and power consumption management, by using the power supply management system.

Although not shown in the figure, the mobile phone 1700 may further include a camera, a Bluetooth module, and the like, and details are not described herein again.

Specifically, in this embodiment of the present invention, the memory 1720 is configured to store computer executable program code;

the input/output subsystem 1770 is configured to control the input device 1730 and an output device, where in this embodiment, the output device may be the display screen 1740;

the processor 1780 is coupled to the memory 1720 and the input/output subsystem 1770;

the processor 1780 is configured to select a first communication object from a target communication object set; and obtain first interaction information corresponding to the first communication object;

the input device 1730 is configured to receive input information by using an information input interface of the first communication object;

the processor 1780 is further configured to determine a matching degree between the input information and the first communication object based on the input information and the first interaction information; and the input device 1730 is configured to perform prompt when the matching degree is less than a first threshold.

Optionally, the processor 1780 is further configured to perform contextual semantic analysis on the input information and the first interaction information, and obtain a correlation between the input information and a context of the first interaction information; and determine the matching degree between the input information and the first communication object based on the correlation.

Optionally, the processor 1780 is further configured to extract a keyword that is used to represent an object relationship and that is in the first interaction information; analyze the keyword by using an object model, and determine a target object relationship corresponding to the first communication object, where the object model is obtained by leaning and training a keyword set for describing the object relationship; and determine the matching degree between the input information and the first communication object based on the target object relationship.

Optionally, the processor 1780 is further configured to extract a keyword that is used to represent an object relationship and that is in the first interaction information, where the object relationship is used to indicate an interpersonal relationship between a user and an object; perform matching between the keyword and a plurality of preset object relationship templates, and determine a target object relationship corresponding to the first communication object, where each of the plurality of object relationship templates includes a keyword set used to represent an object relationship; and determine the matching degree between the input information and the first communication object based on the target object relationship.

Optionally, the processor 1780 is further configured to determine a plurality of communication objects; record a time stamp of a last piece of interaction information corresponding to each of the plurality of communication objects; and determine, when a difference parameter between the time stamp and a current moment is less than a second threshold, that a communication object corresponding to the time stamp is a target communication object.

Optionally, the processor 1780 is further configured to obtain second interaction information corresponding to other communication objects than the first communication object in the target communication object set; determine matching degrees between the input information and the other communication objects based on the input information and the second interaction information; determine a second communication object in the other communication objects, where a matching degree between the second communication object and the input information is highest; and prompt that the second communication object is a communication object corresponding to the input information.

Optionally, the output device 1740 is further configured to display an identifier of the second communication object, where the identifier includes at least one of a communication address, an address link, a name, and an icon of the second communication object.

Optionally, the processor 1780 is further configured to generate a first confirmation instruction in response to a confirmation operation on the identifier; switch, according to the first confirmation instruction, the information input interface correspondingly to the second communication object; and copy the input information to an information input interface of the second communication object.

Optionally, the transceiver is further included, and the transceiver is coupled to the processor 1780;

the input device 1730 is further configured to receive, when the matching degree is greater than or equal to the first threshold, a second confirmation instruction for sending the input information; and the transceiver is configured to send the input information to a server according to the second confirmation instruction.

Optionally, the input device 1730 is further configured to receive a second confirmation instruction for sending the input information; and the processor 1780 is further configured to analyze the input information and the first interaction information according to the second confirmation instruction, and determine the matching degree between the input information and the first communication object; and reject, when the matching degree is less than the first threshold, sending the input information to a server.

An embodiment of the present invention further provides a computer storage medium, configured to store a computer software instruction used by the foregoing apparatus shown in FIG. 17, where the computer storage medium includes a program designed to perform the method embodiments corresponding to FIG. 2 and FIG. 7. Information prompt may be implemented by executing the stored program.

Figure 18:
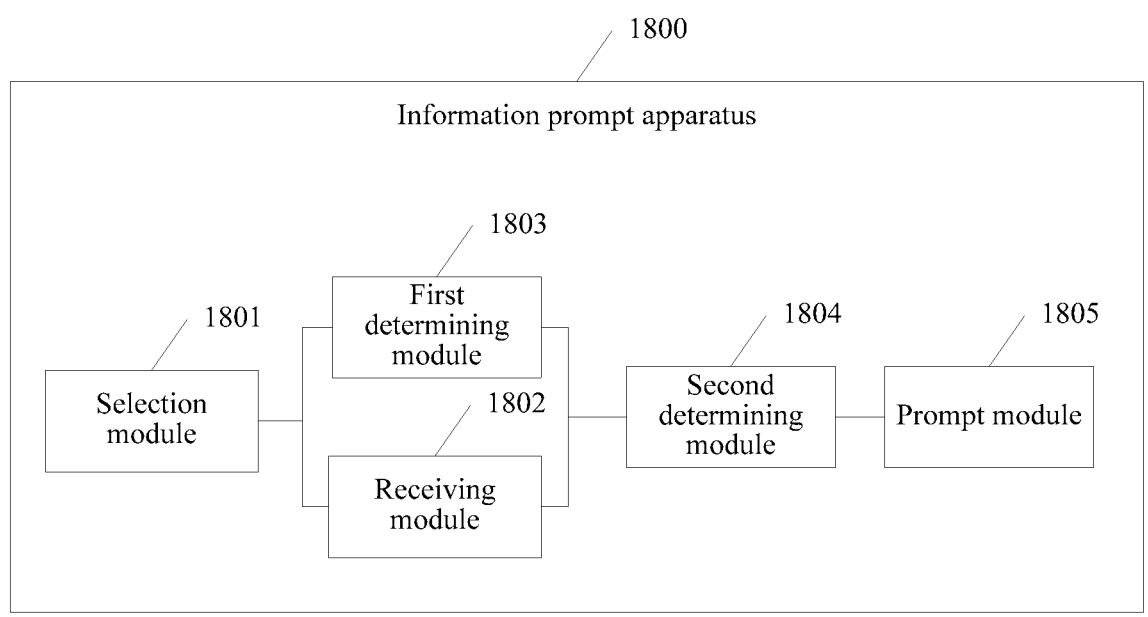
FIG. 18 is a schematic structural diagram of another embodiment of an information prompt apparatus according to an embodiment of the present invention.

Referring to FIG. 18, an embodiment of the present invention further provides another embodiment of an information prompt apparatus 1800 including:

a selection module 1801, configured to select a first communication object from a target communication object set;

a receiving module 1802, configured to receive input information by using an information input interface of the first communication object determined by the selection module 1801;

a first determining module 1803, configured to determine a target object relationship corresponding to the first communication object determined by the selection module 1801, where an object relationship is used to indicate an interpersonal relationship between a user and an object;

a second determining module 1804, configured to determine, based on the target object relationship determined by the first determining module 1803, a matching degree between the input information received by the receiving module 1802 and the first communication object determined by the selection module 1801; and a prompt module 1805, configured to perform prompt when the matching degree determined by the second determining module 1804 is less than a first threshold.

Figure 19:
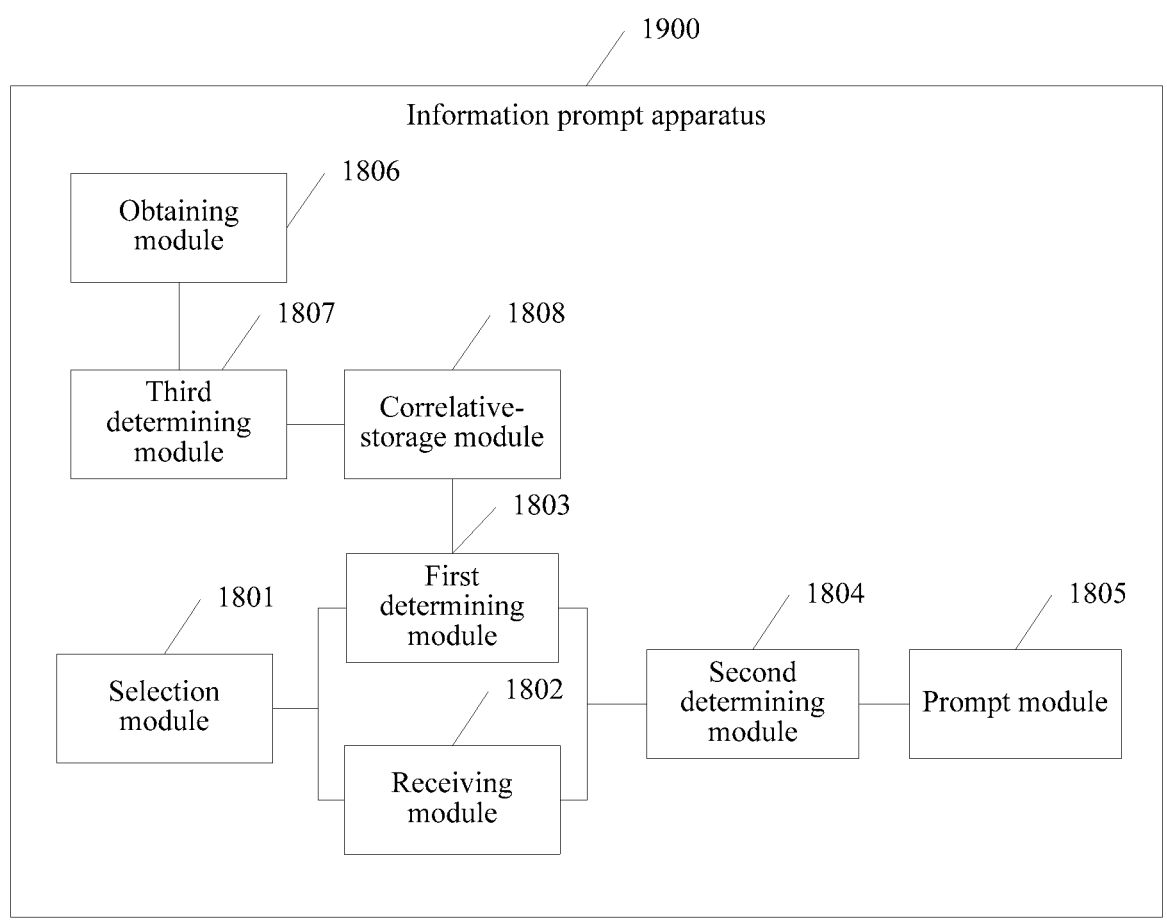
FIG. 19 is a schematic structural diagram of another embodiment of an information prompt apparatus according to an embodiment of the present invention.

Referring to FIG. 19, based on the embodiment corresponding to FIG. 18, an embodiment of the present invention further provides another embodiment of an information prompt apparatus 1900.

The apparatus further includes an obtaining module 1806, a third determining module 1807, and a correlative-storage module 1808.

The obtaining module 1806 is configured to obtain interaction information corresponding to each communication object of target communication objects.

The third determining module 1807 is configured to determine, based on the interaction information obtained by the obtaining module 1806, an object relationship corresponding to each communication object.

The correlative-storage module 1808 is configured to correlatively store the object relationship determined by the third determining module 1807 and the corresponding communication object.

Optionally, the third determining module 1807 is further specifically configured to:

extract a keyword that is used to represent an object relationship and that is in the interaction information; and determine, based on an object model and the keyword, the object relationship corresponding to the communication object, where the object model is obtained by leaning and training a keyword set for describing the object relationship.

Figure 20:
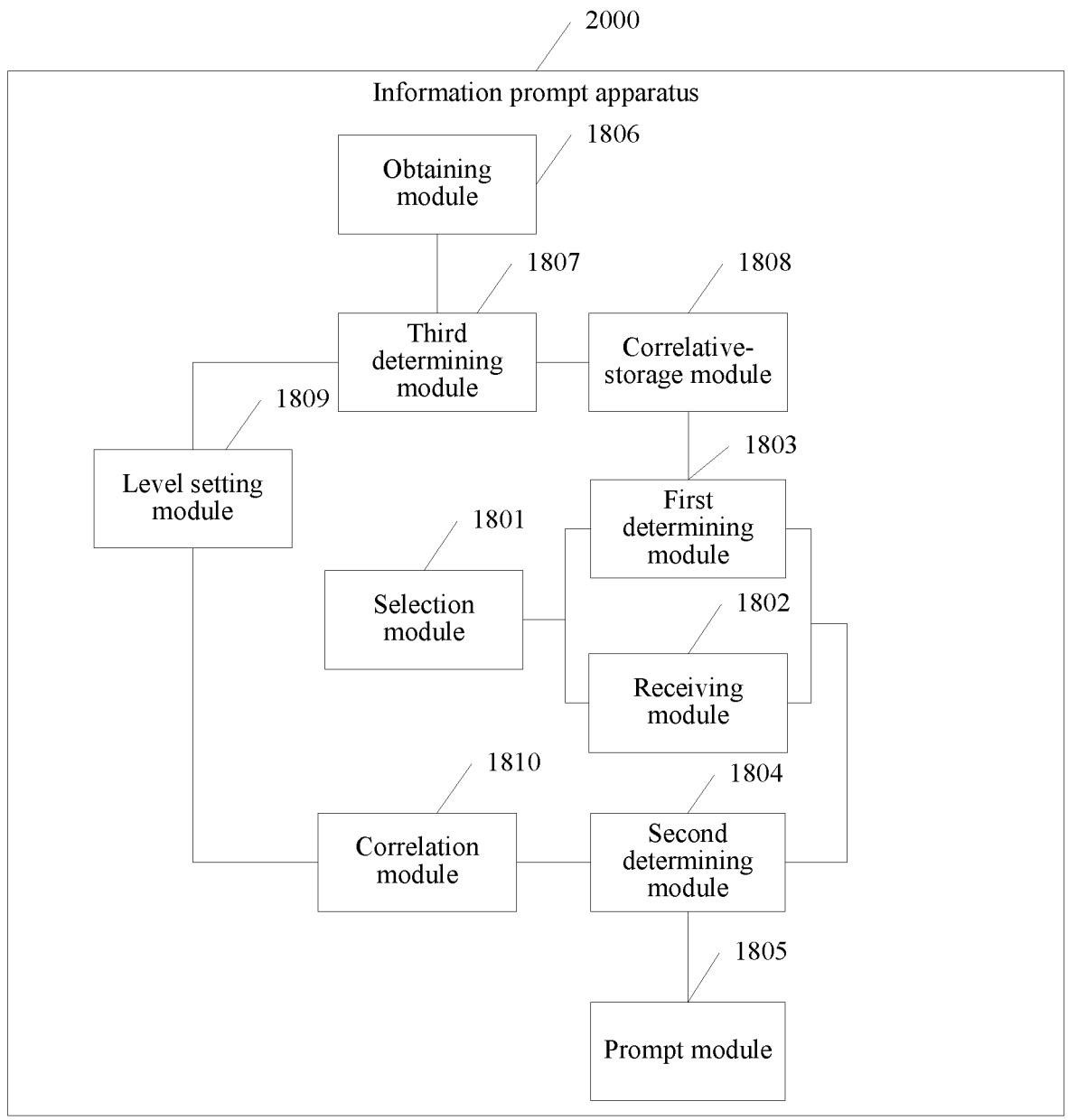
FIG. 20 is a schematic structural diagram of another embodiment of an information prompt apparatus according to an embodiment of the present invention.

Referring to FIG. 20, based on the embodiment corresponding to FIG. 18, another embodiment of the present invention further provides an embodiment of an information prompt apparatus 2000.

The apparatus further includes a level setting module 1809 and a correlation module 1810.

The level setting module 1809 is configured to set a corresponding first security level for each object relationship.

The correlation module 1810 is configured to correlatively store the first security level that is set by the level setting module 1809 and the corresponding object relationship.

The second determining module 1804 is further specifically configured to:

evaluate, by using a security evaluation model, the input information received by the receiving module 1802, and learn that a security level of the input information is a second security level, where the security evaluation model is obtained by performing learning and training in advance on a keyword set used to indicate user information; and perform matching based on the first security level corresponding to the target object relationship determined by the correlation module 1810 and the second security level, and obtain the matching degree between the input information received by the receiving module 1802 and the first communication object.

Optionally, the first determining module 1803 is further specifically configured to:

obtain a name of the first communication object; and determine the target object relationship corresponding to the first communication object based on the name of the first communication object.

Optionally, one blacklist is correspondingly set for each object relationship, where the blacklist includes a plurality of keywords.

The second determining module 1804 is further specifically configured to:

extract keywords in the input information;

perform matching between the keywords in the input information and the keywords in the blacklist corresponding to the target object relationship, and obtain a matching result; and determine the matching degree between the input information and the first communication object based on the matching result.

Figure 21:
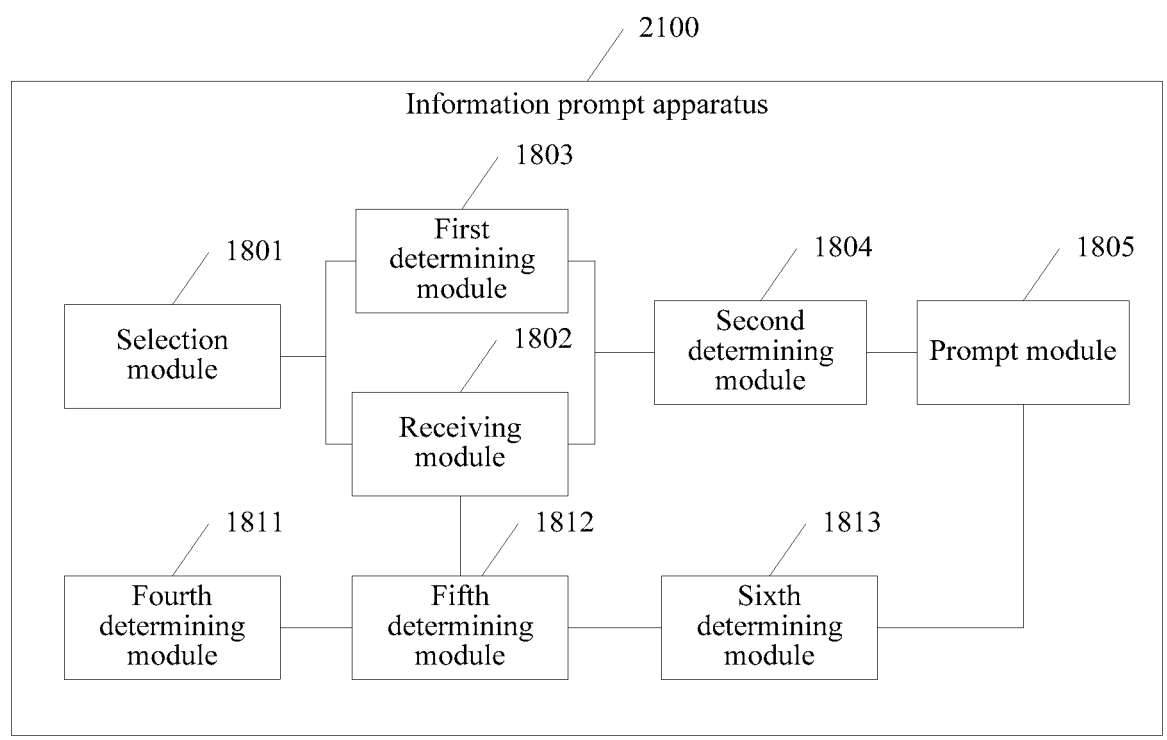
FIG. 21 is a schematic structural diagram of another embodiment of an information prompt apparatus according to an embodiment of the present invention.

Referring to FIG. 21, based on the embodiment corresponding to FIG. 18, an embodiment of the present invention further provides another embodiment of an information prompt apparatus 2100.

The apparatus further includes a fourth determining module 1811, a fifth determining module 1812, and a sixth determining module 1813.

The fourth determining module 1811 is configured to determine a second object relationship corresponding to other communication objects than the first communication object in the target communication object set.

The fifth determining module 1812 is configured to determine matching degrees between the input information received by the receiving module 1802 and the other communication objects based on the second object relationship determined by the fourth determining module 1811.

The sixth determining module 1813 is configured to determine a second communication object in the other communication objects, where a matching degree, determined by the fifth communication object, between the second communication object and the input information is highest.

The prompt module 1805 is further configured to prompt that the second communication object determined by the sixth determining module 1813 is a communication object corresponding to the input information.

Optionally, the prompt module 1805 is further configured to display an identifier of the second communication object, where the identifier includes at least one of a communication address, an address link, a name, and an icon of the second communication object.

Figure 22:
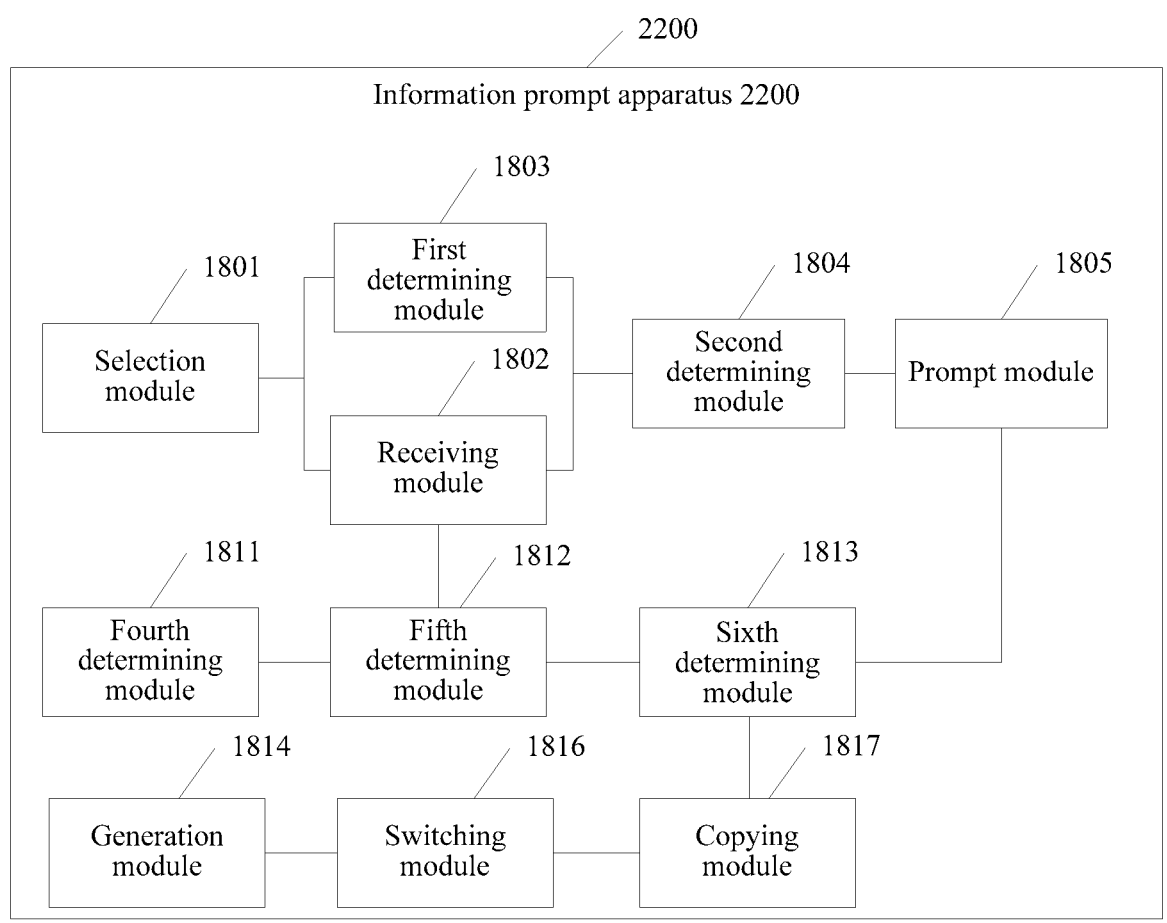
FIG. 22 is a schematic structural diagram of another embodiment of an information prompt apparatus according to an embodiment of the present invention.

Referring to FIG. 22, based on the embodiment corresponding to FIG. 21, an embodiment of the present invention further provides another embodiment of an information prompt apparatus 2200.

The apparatus further includes a generation module 1814, a switching module 1816, and a copying module 1817.

The generation module 1814 is configured to generate a first confirmation instruction in response to a confirmation operation on the identifier.

The switching module 1816 is configured to switch, according to the first confirmation instruction generated by the generation module 1814, the information input interface correspondingly to the second communication object.

The copying module 1817 is configured to copy the input information received by the receiving module 1802 to the information input interface of the second communication object switched by the switching module 1816.

Further, the apparatus in FIG. 18 to FIG. 22 is presented in a form of a functional module. The "module" herein may be an application-specific integrated circuit (application-specific integrated circuit, ASIC), a circuit, a processor for executing one or more software or firmware programs, a memory, an integrated logic circuit, and/or another device that may provide the foregoing function. In a simple embodiment, a form shown in FIG. 17 may be used for the apparatus in FIG. 18 to FIG. 22.

Based on the structure in FIG. 17, the present invention further provides another embodiment of an information prompt apparatus, and the embodiment specifically includes:

a memory 1720, configured to store computer executable program code;

an input/output subsystem 1770, configured to control an input device 1730 and an output device 1740; and a processor 1780, coupled to the memory and the input/output subsystem, where the processor 1780 is configured to select a first communication object from a target communication object set;

the input device 1730 is configured to receive input information by using an information input interface of the first communication object determined by the processor 1780;

the processor 1780 is further configured to determine a target object relationship corresponding to the first communication object, where an object relationship is used to indicate an interpersonal relationship between a user and an object; and determine a matching degree between the input information and the first communication object based on the target object relationship; and the output device 1740 is configured to perform prompt when the matching degree is less than a first threshold.

Optionally, the processor 1780 is further configured to obtain interaction information corresponding to each communication object of target communication objects; determine an object relationship corresponding to the communication object based on the interaction information; and correlatively store the object relationship and the corresponding communication object.

Optionally, the processor 1780 is further configured to extract a keyword that is used to represent an object relationship and that is in the interaction information; and determine, based on an object model and the keyword, the object relationship corresponding to the communication object, where the object model is obtained by leaning and training a keyword set for describing the object relationship.

Optionally, the processor 1780 is further configured to set a corresponding first security level for each object relationship; correlatively store the first security level and the corresponding object relationship; evaluate the input information by using a security evaluation model, and learn that a security level of the input information is a second security level, where the security evaluation model is obtained by performing learning and training in advance on a keyword set used to indicate user information; and perform matching based on the first security level corresponding to the target object relationship and the second security level, and obtain the matching degree between the input information and the first communication object.

Optionally, the processor 1780 is further configured to obtain a name of the first communication object; and determine the target object relationship corresponding to the first communication object based on the name of the first communication object.

Optionally, one blacklist is correspondingly set for each object relationship, where the blacklist includes a plurality of keywords.

The processor 1780 is further configured to extract keywords in the input information; perform matching between the keywords in the input information and the keywords in the blacklist corresponding to the target object relationship, and obtain a matching result; and determine the matching degree between the input information and the first communication object based on the matching result.

Optionally, the processor 1780 is further configured to determine a second object relationship corresponding to other communication objects than the first communication object in the target communication object set; determine matching degrees between the input information and the other communication objects based on the second object relationship; and determine a second communication object in the other communication objects, where a matching degree between the second communication object and the input information is highest.

The output device 1740 is further configured to prompt that the second communication object is a communication object corresponding to the input information.

Optionally, the output device 1740 is further configured to display an identifier of the second communication object, where the identifier includes at least one of a communication address, an address link, a name, and an icon of the second communication object.

Optionally, the processor 1780 is further configured to generate a first confirmation instruction in response to a confirmation operation on the identifier; switch, according to the first confirmation instruction, the information input interface correspondingly to the second communication object; and copy the input information to an information input interface of the second communication object.

Figure 23:
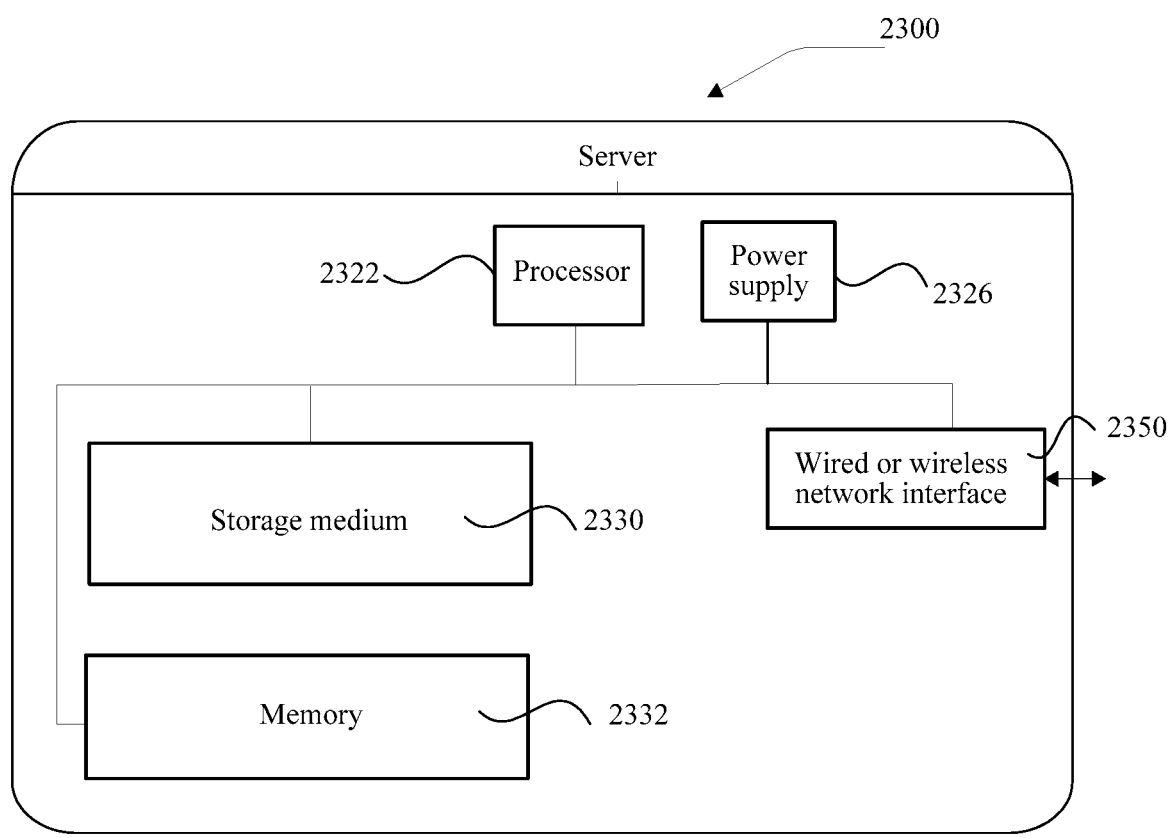
FIG. 23 is a schematic structural diagram of an embodiment of a server according to an embodiment of the present invention.

An embodiment of the present invention further provides a server 2300. Referring to FIG. 23, FIG. 23 is a schematic structural diagram of the server.

FIG. 23 is a schematic structural diagram of a server according to an embodiment of the present invention. The server 2300 may differ greatly due to different configuration or performance, and may include one or more processors 2322, a memory 2332, a data storage medium 2330 (for example, one or more mass storage devices). The memory 2332 and the storage medium 2330 may be transient storages or persistent storages. A program stored in the storage medium 2330 may include one or more modules (not shown), and each module may include a series of instruction operations on the network security server. Furthermore, the processor 2322 may be configured to communicate with the storage medium 2330, and perform a series of instruction operations in the storage medium 2330 on the network security server 2300.

The network security server 2300 may further include one or more power supplies 2326, and one or more wired or wireless network interfaces 2350.

In the foregoing embodiment, a step performed by the network security server may be based on a structure of the server shown in FIG. 23.

The network interface 2350 is configured to receive input information sent by first user equipment, where the input information carries an identifier of a first communication object.

The processor 2322 is configured to determine the first communication object based on the identifier of the first communication object, and obtain first interaction information between the first communication object and a communication object corresponding to the first user equipment; determine a matching degree between the input information and the first communication object based on the input information and the first interaction information; and generate, by the server, prompt information if the matching degree is less than a first threshold. The prompt information may be an identifier of a second communication object.

The network interface 2350 is further configured to send the prompt information to the first user equipment, so that the user equipment performs prompt based on the prompt information.

Optionally, the network interface 2350 is further configured to send, when the matching degree is greater than or equal to the first threshold, the input information to second user equipment corresponding to the first communication object.

Based on the structure of the server in FIG. 2300, an embodiment of the present invention further provides another embodiment of a server including:

a network interface 2350, configured to receive input information sent by first user equipment, where the input information carries an identifier of a first communication object; and a processor 2322, configured to determine the first communication object based on the identifier of the first communication object, and determine a target object relationship between the first communication object and a communication object corresponding to the first user equipment; determine the matching degree between the input information and the first communication object based on the target object relationship; and generate prompt information if the matching degree is less than a first threshold.

The network interface 2350 is further configured to send the prompt information to the first user equipment, so that the first user equipment performs prompt based on the prompt information.

Optionally, the network interface 2350 is further configured to send, when the matching degree is greater than or equal to the first threshold, the input information to second user equipment corresponding to the first communication object.

An embodiment of the present invention further provides another computer storage medium, configured to store computer software instructions used by the device shown in FIG. 23, where the computer storage medium contains a program designed for executing the method embodiments in the foregoing FIG. 9 and FIG. 10. Information prompt may be implemented by executing the stored program.

All or some of the foregoing embodiments may be implemented by means of software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a Solid State Disk (SSD)), or the like.

What is claimed is:

1. An information prompt method, wherein the method is applied to a communication application in an electronic device and is performed by the electronic device, wherein the communication application comprises a plurality of communication objects of a user, and wherein the method comprises:

determining a first communication object from the plurality of communication objects, wherein each communication object in the plurality of communication objects has a corresponding time stamp indicating a time of a last piece of historical interaction information between the communication object and the user, and wherein the corresponding time stamp is within a preset time period before a current time;

obtaining first interaction information corresponding to the first communication object, wherein the first interaction information comprises one or more pieces of historical interaction information between the first communication object and the user;

receiving input information by using an information input interface of the first communication object;

determining a first matching degree between the input information and the first communication object based on the input information and the first interaction information, wherein the first matching degree indicates whether the one or more pieces of historical interaction information matches the input information based on language logic; and prompting that the first communication object is an incorrect communication object corresponding to the input information when the first matching degree is less than a first threshold and the first matching degree indicates that the one or more pieces of historical interaction information does not match the input information.

2. The method according to claim 1, wherein the determining a first matching degree between the input information and the first communication object based on the input information and the first interaction information comprises:

determining a target object relationship between the first communication object and the user; and determining the first matching degree between the input information and the first communication object based on the target object relationship.

3. The method according to claim 2, wherein the determining a target object relationship between the first communication object and the user comprises:

extracting a keyword that is used to represent an object relationship and that is in the first interaction information, wherein the object relationship is used to indicate an interpersonal relationship between a user and an object;

analyzing the keyword by using an object model to obtain an analyzing result, wherein the object model is obtained by leaning and training a keyword set for describing an object relationship; and determining the target object relationship between the first communication object and the user based on the analyzing result.

4. The method according to claim 2, wherein the determining a target object relationship between the first communication object and the user comprises:

extracting a keyword that is used to represent an object relationship and that is in the first interaction information, wherein the object relationship is used to indicate an interpersonal relationship between a user and an object;

performing matching between the keyword and a plurality of preset object relationship templates to obtain a matching result, wherein each template of the plurality of object relationship templates comprises a keyword set used to represent an object relationship; and determining the target object relationship between the first communication object and the user based on the matching result.

5. The method according to claim 1, wherein the plurality of communication objects further comprise a second communication object, and wherein the method further comprises:
obtaining second interaction information corresponding to the second communication object, wherein the second interaction information comprises one or more pieces of historical interaction information between the second communication object and the user;
determining a second matching degree between the input information and the second communication object based on the input information and the second interaction information; and
prompting that the second communication object is a communication object corresponding to the input information when the second matching degree is highest.

6. The method according to claim 5, wherein the prompting that the second communication object is a communication object corresponding to the input information comprises:
displaying an identifier of the second communication object, wherein the identifier comprises at least one of a communication address, an address link, a name, and an icon of the second communication object.

7. The method according to claim 6, wherein the method further comprises:
generating a first confirmation instruction in response to a confirmation operation on the identifier;
switching, according to the first confirmation instruction, the information input interface of the first communication object to an information input interface of the second communication object; and
copying the input information to the information input interface of the second communication object.

8. The method according to claim 1, wherein the determining a first matching degree between the input information and the first communication object comprises:
determining the first matching degree between the input information and the first communication object after receiving a second confirmation instruction for sending the input information.

9. The method according to claim 8, the method further comprises:
rejecting sending the input information when the first matching degree is less than the first threshold.

10. The method according to claim 1, wherein the determining a first matching degree between the input information and the first interaction information based on the input information and the first interaction information comprises:
performing contextual semantic analysis on the input information and the first interaction information;
obtaining a correlation between the input information and the first interaction information; and
determining the first matching degree between the input information and the first communication object based on the correlation.

11. The method according to claim 1, wherein the method further comprises:
receiving, when the first matching degree is greater than or equal to the first threshold, a second confirmation instruction for sending the input information; and
sending the input information according to the second confirmation instruction.

12. The method according to claim 1, further comprising disabling a button for entering the input information when the first matching degree is less than the first threshold.

13. An electronic device with a communication application, wherein the communication application comprises a plurality of communication objects of a user, and wherein the electronic device comprises:
at least one processor; and
at least one memory, the at least one memory comprising instructions that when executed by the at least one processor, cause the electronic device to:
determine a first communication object from the plurality of communication objects, wherein each communication object in the plurality of communication objects has a corresponding time stamp indicating a time of a last piece of historical interaction information between the communication object and the user, and wherein the corresponding time stamp is within a preset time period before a current time;
obtain first interaction information corresponding to the first communication object, wherein the first interaction information comprises one or more pieces of historical interaction information between the first communication object and the user;
receive input information by using an information input interface of the first communication object;
determine a first matching degree between the input information and the first communication object based on the input information and the first interaction information, wherein the first matching degree indicates whether the one or more pieces of historical interaction information matches the input information based on language logic; and
prompt that the first communication object is an incorrect communication object corresponding to the input information when the first matching degree is less than a first threshold and the first matching degree indicates that the one or more pieces of historical interaction information does not match the input information.

14. The electronic device according to claim 13, wherein the electronic device is further configured to:
determine a target object relationship between the first communication object and the user; and
determine the first matching degree between the input information and the first communication object based on the target object relationship.

15. The electronic device according to claim 14, wherein the electronic device is further configured to:
extract a keyword that is used to represent an object relationship and that is in the first interaction information, wherein the object relationship is used to indicate an interpersonal relationship between a user and an object;
analyze the keyword by using an object model to obtain an analyzing result, wherein the object model is obtained by leaning and training a keyword set for describing an object relationship; and
determine the target object relationship between the first communication object and the user based on the analyzing result.

16. The electronic device according to claim 14, wherein the electronic device is further configured to:
extract a keyword that is used to represent an object relationship and that is in the first interaction information, wherein the object relationship is used to indicate an interpersonal relationship between a user and an object;

perform matching between the keyword and a plurality of preset object relationship templates to obtain a matching result, wherein each template of the plurality of object relationship templates comprises a keyword set used to represent an object relationship; and determine the target object relationship between the first communication object and the user based on the matching result.

17. The electronic device according to claim 13, wherein the plurality of communication objects further comprise a second communication object, and wherein the electronic device is further configured to:

obtain second interaction information corresponding to the second communication object, wherein the second interaction information comprises one or more pieces of historical interaction information between the second communication object and the user;

determine a second matching degree between the input information and the second communication object based on the input information and the second interaction information; and prompt that the second communication object is a communication object corresponding to the input information when the second matching degree is highest.

18. The electronic device according to claim 17, wherein the electronic device is further configured to:

display an identifier of the second communication object, wherein the identifier comprises at least one of a communication address, an address link, a name, and an icon of the second communication object.

19. The electronic device according to claim 13, wherein the electronic device is further configured to:

perform contextual semantic analysis on the input information and the first interaction information;

obtain a correlation between the input information and the first interaction information; and determine the first matching degree between the input information and the first communication object based on the correlation.

20. The electronic device according to claim 13, wherein the instructions cause the electronic device to disable a button for entering the input information when the first matching degree is less than the first threshold.

* * * * *